(12) United States Patent
Lim et al.

(10) Patent No.: US 10,128,669 B2
(45) Date of Patent: Nov. 13, 2018

(54) METHOD OF TRANSMITTING AND RECEIVING POWER AND ELECTRONIC DEVICE USING THE SAME

(71) Applicant: Samsung Electronics Co., Ltd., Gyeonggi-do (KR)

(72) Inventors: Kyungwoo Lim, Gyeonggi-do (KR); Kihyun Kim, Gyeonggi-do (KR); Seho Park, Gyeonggi-do (KR); Hyunsup Park, Seoul (KR); Wooram Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 60 days.

(21) Appl. No.: 15/138,316

(22) Filed: Apr. 26, 2016

(65) Prior Publication Data
US 2017/0012446 A1  Jan. 12, 2017

(30) Foreign Application Priority Data

Jul. 6, 2015 (KR) .......................... 10-2015-0096082

(51) Int. Cl.
*H02J 7/00* (2006.01)
*H02J 50/10* (2016.01)
*H02J 7/02* (2016.01)

(52) U.S. Cl.
CPC .......... *H02J 7/0027* (2013.01); *H02J 7/0021* (2013.01); *H02J 7/0026* (2013.01); *H02J 7/025* (2013.01); *H02J 50/10* (2016.02)

(58) Field of Classification Search
CPC ........ H02J 7/025; H01F 38/14; Y02T 90/122; B60L 11/182; Y02E 60/12

USPC ......................................................... 320/108
See application file for complete search history.

(56) References Cited

U.S. PATENT DOCUMENTS

| | | | | | |
|---|---|---|---|---|---|
| 4,274,043 | A | * | 6/1981 | Heitz ................ | H01M 10/4207 307/151 |
| 2002/0089305 | A1 | * | 7/2002 | Park ....................... | H02J 7/025 320/108 |
| 2004/0267501 | A1 | * | 12/2004 | Freed ..................... | H02J 7/025 702/184 |
| 2006/0214628 | A1 | * | 9/2006 | Chang .................... | H02J 7/025 320/108 |
| 2008/0061733 | A1 | * | 3/2008 | Toya ...................... | H02J 7/025 320/103 |

(Continued)

FOREIGN PATENT DOCUMENTS

KR  10-2014-0062811 A  5/2014

*Primary Examiner* — Arun Williams
(74) *Attorney, Agent, or Firm* — Cha & Reiter, LLC

(57) ABSTRACT

An electronic device comprising: a battery having a plurality of cells that are connected in series; a circuit electrically connected to the battery; and a conductive pattern electrically connected to the circuit, wherein the circuit is configured to: receive a first signal wirelessly from a first external device by using the conductive pattern, charge at least some of the plurality of cells in the battery by using a power of the first signal, generate a second signal by changing a first voltage, that is produced by at least two of the plurality of cells in the battery, into a second voltage that is lower than the first voltage, and wirelessly transmit the second signal to a second external device, the second signal being transmitted by using the conductive pattern.

17 Claims, 33 Drawing Sheets

(56) References Cited

U.S. PATENT DOCUMENTS

2011/0260681 A1* 10/2011 Guccione ............. H02J 7/0054
　　　　　　　　　　　　　　　　　　　320/108

* cited by examiner

METHOD OF TRANSMITTING AND RECEIVING POWER AND ELECTRONIC DEVICE USING THE SAME

CLAIM OF PRIORITY

This application claims the priority under 35 U.S.C. § 119(a) to Korean Application Serial No. 10-2015-0096082, which was filed in the Korean Intellectual Property Office on Jul. 6, 2015, the entire content of which is hereby incorporated by reference.

TECHNICAL FIELD

Various embodiments of the present disclosure relate to an apparatus and method for transmitting and receiving power in an electronic device.

BACKGROUND

Portable electronic devices, such as portable terminals, tablet computers, smartphones, etc., may use rechargeable batteries as power supply units in order to provide a mobility thereof. Accordingly, users of the portable electronic devices can more conveniently use the electronic devices beyond a wired environment for power supply to the electronic devices.

When the residual quantities of the batteries are insufficient, the portable electronic devices may recharge the batteries using external power supply devices. For example, the users of the portable electronic devices may recharge the batteries of the portable electronic devices by using auxiliary battery (power bank) devices.

SUMMARY

The auxiliary battery devices may recharge batteries thereof through external power that is received in a wired or wireless manner. The auxiliary battery devices may supply the battery power thereof to the portable electronic devices through wired connection with the portable electronic devices. The users have to connect the auxiliary battery devices and the portable electronic devices through a cable in order to recharge the batteries of the portable electronic devices by using the auxiliary battery devices.

The portable electronic devices may recharge the batteries thereof through the external power that is received in a wireless or wired manner. Likewise to the auxiliary battery devices, the portable electronic devices may provide auxiliary battery functions of supplying the battery power thereof to external devices. In this case, the portable electronic devices may supply the battery power thereof to the external devices through wired connection with the external devices. For example, the portable electronic devices may supply the battery power thereof to the external devices by using Universal Serial Bus On-The-Go (USB OTG). The users have to connect the portable electronic devices and the external devices, which are to be supplied with the power, through cables in order to use the auxiliary battery functions of the portable electronic devices.

Various embodiments of the present disclosure may provide a device and method for supplying power to an external device by a portable electronic device in wireless and wired manners.

According to aspects of the disclosure, an electronic device is provided comprising: a battery having a plurality of cells that are connected in series; a circuit electrically connected to the battery; and a conductive pattern electrically connected to the circuit, wherein the circuit is configured to: receive a first signal wirelessly from a first external device by using the conductive pattern, charge at least some of the plurality of cells in the battery by using a power of the first signal, generate a second signal by changing a first voltage, that is produced by at least two of the plurality of cells in the battery, into a second voltage that is lower than the first voltage, and wirelessly transmit the second signal to a second external device, the second signal being transmitted by using the conductive pattern.

According to aspects of the disclosure, an electronic device is provided comprising: a battery including a plurality of cells that are connected in series; and a circuit electrically connected to the battery, wherein the circuit is configured to: receive a first signal from a first external device, the first signal being received over one of a wired channel and a wireless channel, charge at least some of the plurality of cells in the battery by using a power of the first signal, generate a second signal by using at least two of the plurality of cells in the battery, and transmit the second signal to a second external device.

According to aspects of the disclosure, a method for use in an electronic device is provided, comprising: receiving a first signal from a first external device, the first signal being received over a wireless channel; charging at least some of a plurality of cells in a battery of the electronic device by using a power of the first signal; generating a second signal by changing a first voltage that is generated by at least two of the plurality of cells in the battery into a second voltage that is lower than the first voltage; and wirelessly transmitting the second signal to a second external device.

According to aspects of the disclosure, a method for use in an electronic device is provided, comprising: receiving a first signal from a first external device, wherein the first signal is received over one of a wired channel or a wireless channel; charging at least some of a plurality of cells in a battery of the electronic device by using a power of the first signal; generating a second signal by using at least two of the plurality of cells in the battery; and transmitting the second signal to a second external device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
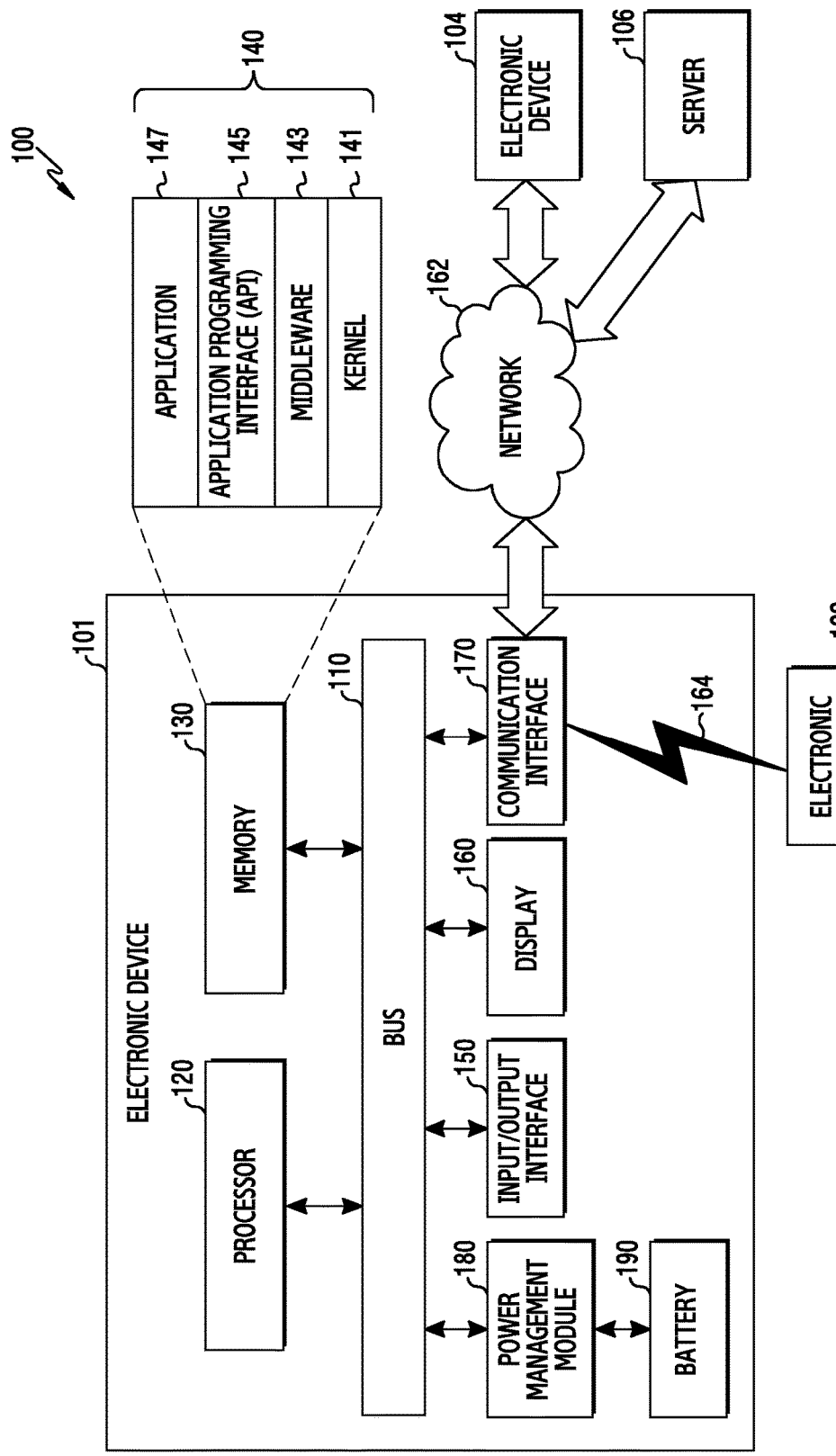
FIG. 1 is a diagram of an example of a network environment, according to various embodiments of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; a power bank; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may include at least one of: a medical equipment (e.g., a mobile medical device (e.g., a blood glucose monitoring device, a heart rate monitor, a blood pressure monitoring device or a temperature meter)); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

FIG. 1 is a diagram of an example of a network environment, according to various embodiments.

The electronic device 101 in the network environment 100, according to the various embodiments, will be described below with reference to FIG. 1. The electronic device 101 may include a bus 110, a processor 120, a memory 130, an input/output interface 150, a display 160, a communication interface 170, a power management module 180 and a sensor 190. In an embodiment, at least one of the elements of the electronic device 101 may be omitted, or other elements may be additionally included in the electronic device 101.

The bus 110 may include, for example, a circuit that interconnects the elements 110 to 170 and transfers communication (e.g., a control message and/or data) between the elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. Additionally or alternatively, the processor 120 may include one or more of a central processing unit (CPU), an application processor (AP), and a communication processor (CP). The processor 120 may, for example, perform an operation or data processing on control and/or communication of at least one other element of the electronic device 101.

According to an embodiment, the processor 120 may control to charge the battery 190. The processor 120 may control to discharge the battery 190.

According to an embodiment, the processor 120 may control to open and short-circuit a battery charging path and a battery discharging path in order to correspond to a charging mode of the battery 190. For example, the processor 120 may control switches that are included in the battery charging path and the battery discharging path, respectively, in order to correspond to the charging mode of the battery 190. Here, the battery charging path may include a wired charging path and a wireless charging path. The battery discharging path may include a wireless discharging path, a wired discharging path, and at least one wired power supply path. The wired power supply path may include a path for directly supplying external power, which the electronic device has received through a wired connection, to an external device.

According to an embodiment, the processor 120 may control to discharge electricity from the battery 190 to a plurality of external devices. For example, the processor 120 may adjust the amount of power to be supplied to each external device in order to correspond to a charging variable of the external device. Here, the charging variable of the external device may include a condition for completely charging the battery of the external device. For example, the charging variable of the external device may include at least one of the battery capacity (the whole battery capacity) of the external device, the battery residual quantity of the external device, information on the connection with the external device, and the operating state of the external device. The information on the connection with the external device may include wired or wireless charging, rapid or normal charging, etc. The operating state of the external device may include the number or types of applications that are being executed in the external device. Additionally, the charging variable of the external device may further include battery charging completion time information. The battery charging completion time information may include time required for fully charging the battery of the external device, or time required by a user to charge the battery to a preset battery level. The battery charging completion time information may be set automatically or based on the user's setting information (e.g., charging time, an amount of charging, a priority, etc.).

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may store, for example, instructions or data relevant to at least one other element of the electronic device 101. According to an embodiment, the memory 130 may store software and/or a program 140. For example, the program may include a kernel 141, middleware 143, an application programming interface (API) 145, and an application (or "application program") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143, for example, may function as an intermediary for allowing the API 145 or the application 147 to communicate with the kernel 141 to exchange data.

In addition, the middleware 143 may process one or more task requests received from the application 147 according to priorities thereof. For example, the middleware 143 may assign priorities for using the system resources (e.g., the bus 110, the processor 120, the memory 130, or the like) of the electronic device 101, to at least one of the application 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150 (e.g., including input/output circuitry), for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 (e.g., including display circuitry), for example, may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160, for example, may display various types of content (e.g., text, images, videos, icons, or symbols) to the user. The display 160 may include a touch screen and receive, for example, a touch, gesture, proximity, or hovering input using an electronic pen or the user's body part.

The communication interface 170 (e.g., including communication circuitry), for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short-range communication 164. The short-range communication 164 may be performed by using at least one of, for example, Wi-Fi, Bluetooth, Near Field Communication (NFC), and Global Navigation Satellite System (GNSS). The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard-232 (RS-232), and a Plain Old Telephone Service (POTS). The network 162 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic device (e.g., the electronic device 102 or 104 or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

The power management module 180 (e.g., including power management circuitry) may control the charging and discharging of the battery 190. According to an embodiment, the power management module 180 may include a Power Management Integrated Circuit (PMIC) or a charger Integrated Circuit (IC).

According to an embodiment, the power management module 180 may receive power from the outside in a wired and/or wireless manner. For example, the power management module 180 may receive power from the outside through a wireless charging method, such as a magnetic resonance type, a magnetic induction type, an electromagnetic wave type, etc. The power management module 180 may further include a coil loop, a resonance circuit, a rectifier, or the like, which is an additional circuit for receiving power in a wireless manner. According to an embodiment, the power management module 180 may include a coil loop and/or a resonance circuit to supply power in a wireless manner.

According to an embodiment, the battery 190 may supply power to the electronic device 101 or an external device through the power management module 180. For example, the battery 190 may include a plurality of cells, and may supply power to an external device by connecting at least two cells in series. The battery 190 may additionally include a power supply control circuit that adjusts an amount of power to be supplied to each cell on the basis of the amount of charge of the cell when at least two cells are connected in series in order to discharge the battery. For example, the battery 190 may supply power to an external device by selectively connecting at least two cells in series or in parallel on the basis of a charging variable of the external device.

According to an embodiment, the battery 190 may be charged with external power that is supplied through the power management module 180. For example, the battery 190 may include a plurality of cells, and may be charged with external power while at least two cells are connected in parallel. The battery 190 may additionally include a charging control circuit that adjusts an amount of electricity to be charged in each cell on the basis of the amount of charge of the cell when at least two cells are connected in parallel in order to charge the battery.

According to various embodiments of the present disclosure, when the electronic device 101 is an auxiliary battery device, the electronic device 101 may not include at least one of the program module 140, the display 160, and the communication interface 170.

Figure 2:
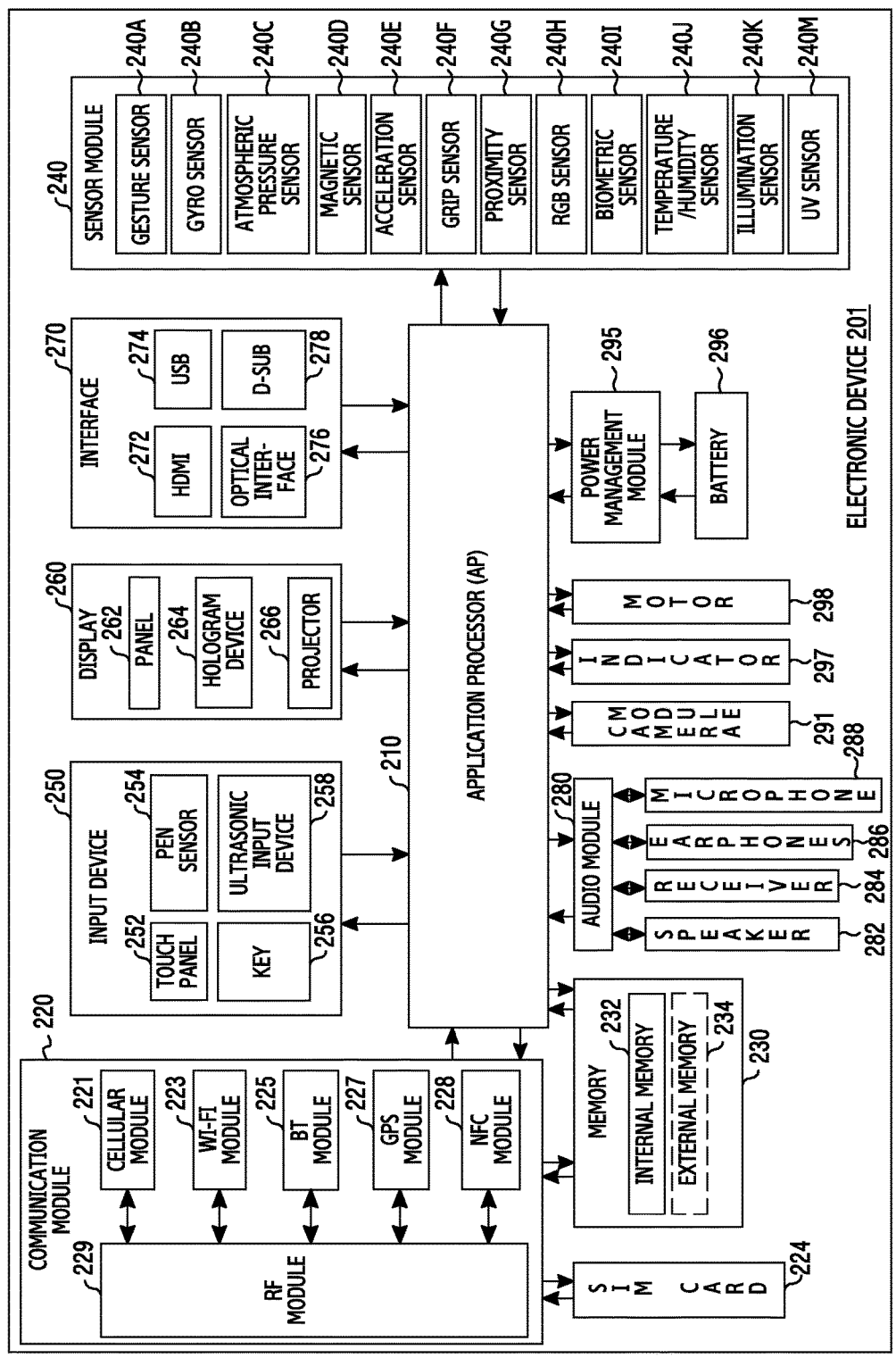
FIG. 2 is a block diagram of an example of an electronic device, according to various embodiments of the present disclosure.

FIG. 2 is a block diagram of an electronic device 201, according to various embodiments. The electronic device 201 may include, for example, all or a part of the electronic device 101 illustrated in FIG. 1. The electronic device 201 may include at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may, for example, control a plurality of hardware or software elements connected thereto and perform a variety of data processing and calculations by driving an operating system or application programs. The AP 210 may be implemented as, for example, a system on chip (SoC). According to an embodiment, the AP 210 may further include a graphic processing unit (GPU) and/or an image signal processor. The AP 210 may include at least some of the elements (e.g., a cellular module 221) illustrated in FIG. 2. The AP 210 may load commands or data, received from at least one other element (e.g., a non-volatile memory), in a volatile memory to process the loaded commands or data, and may store various types of data in the non-volatile memory.

The communication module 220 may have a configuration that is the same as or similar to that of the communication interface 160 of FIG. 1. The communication module 220 may include, for example, a cellular module 221, a Wi-Fi module 223, a BT module 225, a GPS module 227, an NFC module 228, and a radio frequency (RF) module 229. The communication module 220 provides a function of transmitting/receiving a signal. Accordingly, the communication module 220 may be referred to as a "reception unit", a "transmission unit", a "transmission and reception unit", a "communication unit", or the like.

The cellular module 221 may provide, for example, a voice call, a video call, a text message service, or an Internet service through a communication network. According to an embodiment, the cellular module 221 may distinguish and authenticate the electronic device 201 in the communication network by using a subscriber identification module (e.g., the SIM card 224). According to an embodiment, the cellular module 221 may perform at least some of the functions that the AP 210 may provide. According to an embodiment, the cellular module 221 may include a communication processor (CP).

The Wi-Fi module 223, the BT module 225, the GPS module 227, or the NFC module 228 may include, for example, a processor for processing data transmitted/received through the corresponding module. According to an embodiment, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the BT module 225, the GPS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid-state drive (SSD)).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor 240I, a temperature/humidity sensor 240J, an illumination sensor 240K, and an ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment, the electronic device 201 may further include a processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 140 illustrated in FIG. 1. The audio module 280 may, for example, process sound information that is input or output through the speaker 282, the receiver 284, the earphones 286, the microphone 288, or the like.

The camera module 291 may be, for example, a device that can take a still image or a moving image, and according to an embodiment, the camera module 291 may include one or more image sensors (e.g., a front sensor or a rear sensor), a lens, an image signal processor (ISP), or a flash (e.g., an LED or a xenon lamp).

The power management module 295 (e.g., the power management module 180) may manage, for example, the power of the electronic device 201. According to an embodiment, the power management module 295 may include a Power Management Integrated Circuit (PMIC), a charger Integrated Circuit (IC), or a battery or fuel gauge. The power management module 295 may receive power from the outside in a wired and/or wireless manner. For example, the power management module 295 may receive power from the outside through a wireless charging method, such as a magnetic resonance type, a magnetic induction type, an electromagnetic wave type, etc. The power management module 295 may further include a coil loop, a resonance circuit, a rectifier, or the like, which is an additional circuit for receiving power in a wireless manner. The battery gauge may measure, for example, the residual quantity of the battery 296, and a voltage, a current, or a temperature while charging.

The battery 296 (e.g., the battery 190) may include, for example, a rechargeable battery and/or a solar battery. According to an embodiment, the battery 296 may include a plurality of cells that can be connected in series or in parallel.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration or haptic effect. Although not illustrated, the electronic device 201 may include a processing unit (e.g., a GPU) for mobile TV support. The processing device for mobile TV support may, for example, process media data according to a standard of digital multimedia broadcasting (DMB), digital video broadcasting (DVB), media flow, or the like.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 3:
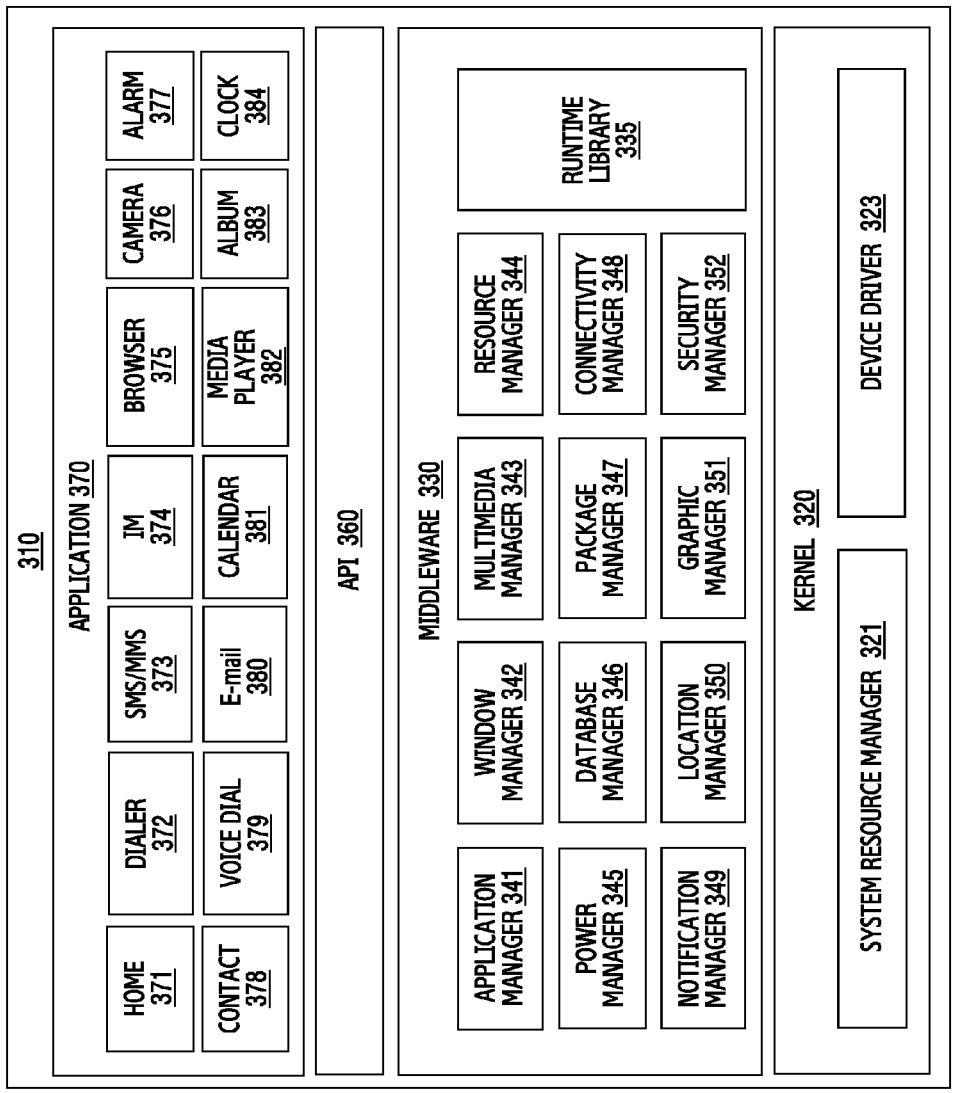
FIG. 3 is a block diagram of an example of a program module, according to various embodiments of the present disclosure.

FIG. 3 is a block diagram of a program module 310, according to various embodiments. According to an embodiment, the program module 310 (e.g., the program 140) may include an operating system (OS) that controls resources relating to an electronic device (e.g., the electronic device 101) and/or various applications (e.g., the application 147) executed in the operating system. The operating system may be, for example, Android, iOS™, Windows™, Symbian™, Tizen™, Bada™, or the like.

The programming module 310 may include a kernel 320, middleware 330, an application programming interface (API) 360, and/or applications 370. At least some of the program module 310 may be preloaded in the electronic device, or may be downloaded from a server (e.g., the server 106).

The kernel 320 (e.g., the kernel 141 of FIG. 1) may include, for example, a system resource manager 321 or a device driver 323. The system resource manager 321 may control, allocate, or collect system resources. According to an embodiment, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an inter-process communication (IPC) driver.

The middleware 330 may provide a function required by the applications 370 in common, or may provide various functions to the applications 370 through the API 360 to enable the applications 370 to efficiently use limited system resources in the electronic device. According to an embodiment, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler in order to add a new function through a programming language during the execution of the applications 370. The run time library 335 may perform input/output management, memory management, or a function for an arithmetic function.

The application manager 341 may manage, for example, a life cycle of at least one of the applications 370. The window manager 342 may manage GUI resources used by a screen. The multimedia manager 343 may identify a format required for reproducing various media files, and may encode or decode a media file using a codec suitable for the corresponding format. The resource manager 344 may manage resources of at least one of the applications 370, such as a source code, a memory, a storage space, and the like.

The power manager 345 may operate together with, for example, a basic input/output system (BIOS) to manage a battery or power and provide power information required for an operation of the electronic device. The database manager 346 may generate, search, or change a database to be used by at least one of the applications 370. The package manager 347 may manage installation or update of an application distributed in the format of a package file.

The connectivity manager 348 may manage, for example, a wireless connection, such as Wi-Fi or Bluetooth. The notification manager 349 may display or notify of an event, such as a received message, an appointment, and a proximity notification, in such a manner as not to disturb a user. The location manager 350 may manage location information of the electronic device. The graphic manager 351 may manage a graphic effect to be provided to a user, or a user interface related thereto. The security manager 352 may provide all security functions required for system security or user authentication. According to an embodiment, when the electronic device (e.g., the electronic device 101) has a telephone call function, the middleware 330 may further include a telephony manager for managing a voice or video call function of the electronic device.

The middleware 330 may include a middleware module that forms combinations of various functions of the aforementioned elements. The middleware 330 may provide specialized modules according to the types of operating systems in order to provide differentiated functions. In addition, the middleware 330 may dynamically delete some of the existing elements, or may add new elements.

The API 360 (e.g., the API 145) may be, for example, a set of API programming functions, and may be provided with different configurations according to operating systems. For example, in the case of Android or iOS, one API set may be provided for each platform, and in the case of Tizen, two or more API sets may be provided for each platform.

The applications 370 (e.g., the application 147) may include, for example, one or more applications that can provide functions, such as home 371, dialer 372, SMS/MMS 373, instant message (IM) 374, browser 375, camera 376, alarm 377, contact 378, voice dialer 379, e-mail 380, calendar 381, media player 382, album 383, clock 384, health care (e.g., to measure exercise quantity or blood sugar), or environment information (e.g., atmospheric pressure, humidity, or temperature information).

According to an embodiment, the applications 370 may include an application (hereinafter, referred to as an "information exchange application" for convenience of the description) that supports information exchange between the electronic device (e.g., the electronic device 101) and external electronic devices (e.g., the electronic devices 102 and 104). The information exchange application may include, for example, a notification relay application for transmitting specific information to the external electronic device, or a device management application for managing the external electronic device.

For example, the notification relay application may include a function of transferring, to an external electronic device (e.g., the electronic device 102 or 104), notification information generated from other applications of the electronic device (e.g., an SMS/MMS application, an e-mail application, a health management application, or an environmental information application). Furthermore, the notification relay application may, for example, receive notification information from an external electronic device and provide the received notification information to a user. The device management application may, for example, manage (e.g., install, delete, or update) at least one function of an external electronic device (e.g., the electronic device 104) communicating with the electronic device (for example, a function of turning on/off the external electronic device itself (or some elements thereof), or a function of adjusting luminance (or a resolution) of the display), applications operating in the external electronic device, or services provided by the external electronic device (e.g., a telephone call service or a message service).

According to an embodiment, the applications 370 may include an application (e.g., a health care application) specified according to attributes (e.g., attributes of the electronic device such as the type of electronic device which corresponds to a mobile medical device) of the external electronic device (e.g., the electronic device 102 or 104). According to one embodiment, the applications 370 may include an application received from an external electronic device (e.g., the server 106 or the electronic device 102 or 104). According to an embodiment, the applications 370 may include a preloaded application or a third party application that can be downloaded from a server. The names of the elements of the program module 310, according to the embodiment illustrated in the drawing, may vary according to the type of operating system.

According to various embodiments, at least a part of the programming module 310 may be implemented in software, firmware, hardware, or a combination of two or more thereof. At least some of the programming module 310 may be implemented (for example, executed) by, for example, the processor (for example, the AP 210). At least some of the programming module 310 may include, for example, a module, program, routine, sets of instructions, process, or the like for performing one or more functions.

Figure 4:
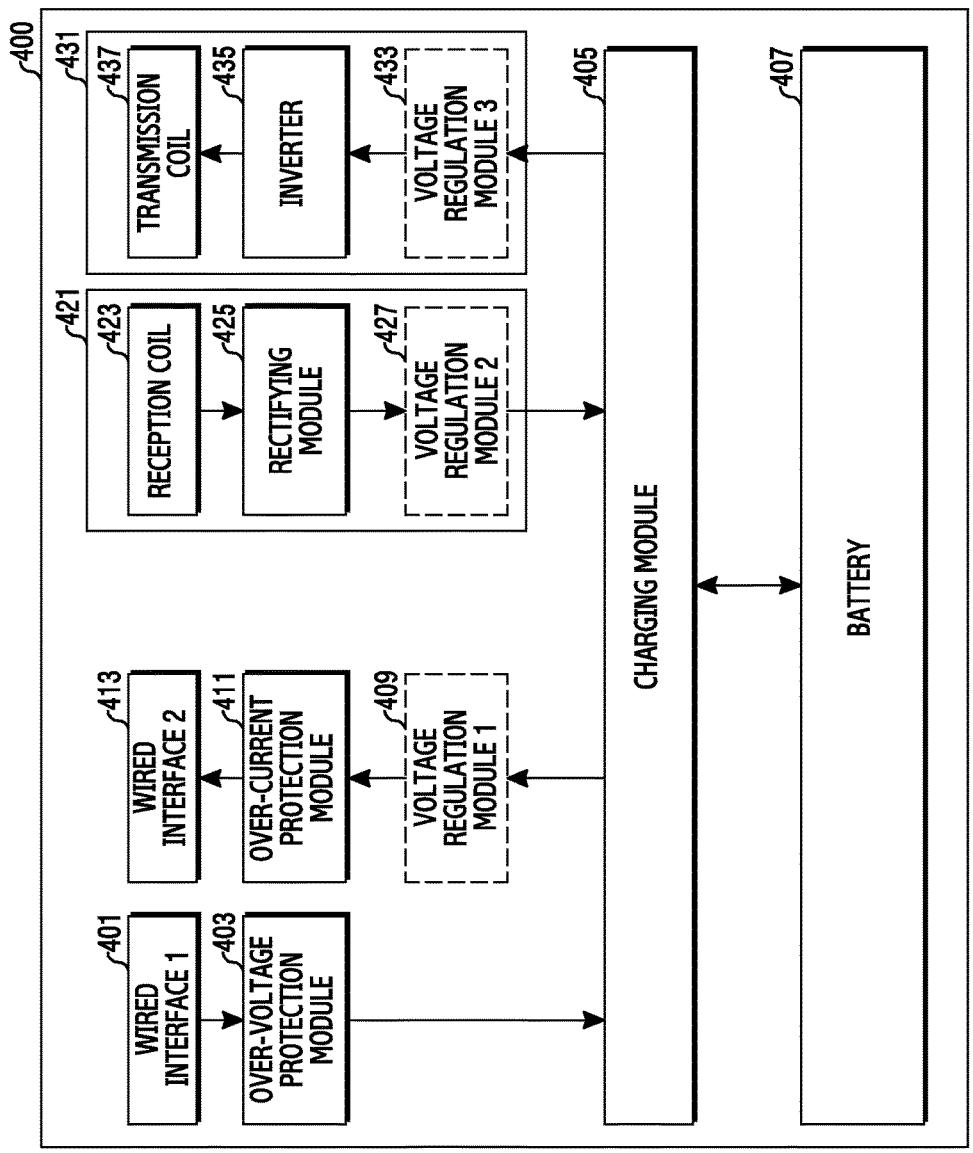
FIG. 4 is a diagram of an example of an electronic device, according to various embodiments of the present disclosure.

FIG. 4 is a diagram of an example of an electronic device, according to various embodiments of the present disclosure. In the following description, the internal structure of the electronic device 400 may correspond to that for charging or discharging the battery of the electronic device 101 of FIG. 1 or the battery of the electronic device 201 of FIG. 2.

Referring to FIG. 4, the electronic device 400, according to the various embodiments of the present disclosure, may include wired interfaces 401, 413, an Over-Voltage Protection (OVP) module 403, a charging module 405, a battery 407, a voltage regulation module 409, an over-current protection module 411, a wireless power reception module 421, and a wireless power transmission module 431.

The wired interfaces 401, 413 may be connected to external devices in a wired manner in order to charge and discharge the battery 407. According to an embodiment, the wired interface 1 (401) may be connected to an external power supply device (e.g., an auxiliary battery device, a charging adaptor, etc.) via a wired connection in order to charge the battery 407. According to an embodiment, the wired interface 2 (413) may be connected to an external device (e.g., a wearable device), via a wired connection, in order to discharge the battery 407. According to an embodiment, the wired interface 1 (401) and the wired interface 2 (413) may be integrated into the same interface.

The over-voltage protection module 403 may protect the electronic device 400 from an over-voltage caused by the external power supply device that is connected through the wired interface 1 (401).

The charging module 405 may charge the battery 407. For example, the charging module 405 may supply, to the battery 407, external power that is received through the wired interface 1 (401) or the wireless power reception module 421.

The battery 407 (e.g., the battery 190), which includes a plurality of cells, may be charged with the external power and may supply power to the external device. According to an embodiment, the cells of the battery 407 may be connected to each other in series. According to an embodiment, the cells of the battery 407 may be selectively connected to each other in series or in parallel. For example, at least two cells of the battery 407 may be connected in series in order to discharge the battery, and at least two cells of the battery 407 may be connected in parallel in order to charge the battery.

The voltage regulation module 1 (409) may drop the output voltage of the battery 407 to a predetermined level (e.g., 5 V). For example, when the output voltage of the battery 407 is higher than a reference voltage (e.g., 5 V) by the series connection between the plurality of cells, the voltage regulation module 1 (409) may drop the output voltage of the battery 407 to the reference voltage. For example, the voltage regulation module 1 (409) may include a DC/DC converter, a buck converter, a Low Drop Out (LDO) regulator, or the like.

The over-current protection module 411 may cut off an over-current to prevent the over-current from being supplied to the external device that is connected through the wired interface 2 (413).

The wireless power reception module 421 may receive external power wirelessly through a wireless power reception method. For example, the wireless power reception module 421 may include a reception coil 423 for receiving external power in a wireless manner, a rectifying module 425, and a voltage regulation module 2 (427).

The reception coil 423 may include a coil loop and a resonance circuit in order to receive power in a wireless manner. For example, the coil loop and the resonance circuit may be shared with a transmission coil 437 of the wireless power transmission module 431.

The rectifying module 425 may convert AC power received from the reception coil 423 into DC power. For example, the rectifying module 425 may include a half bridge rectifying module or a full-bridge rectifying module.

The voltage regulation module 2 (427) may convert the DC power received from the rectifying module 425 into DC power suitable for the charging module 405. For example, the voltage regulation module 2 (427) may include a DC/DC converter, an LDO regulator, or the like.

The wireless power transmission module 431 may supply power, which is received from the battery 407 or the wired interface 1 (401), to an external device through a wireless power supply method. For example, the wireless power transmission module 431 may include a voltage regulation module 3 (433), an inverter 435, and the transmission coil 437.

The voltage regulation module 3 (433) may convert the output voltage of the battery 407, which is received from the charging module 405, into DC power suitable for an external device that receives the power.

The inverter 435 may convert the DC power, which is received from the voltage regulation module 3 (433), into AC power, and may supply the AC power to the external device through the transmission coil 437.

The transmission coil 437 may include a coil loop and a resonance circuit in order to supply power wirelessly. For example, the coil loop and the resonance circuit may be shared with the reception coil 423 of the wireless power reception module 421.

In various embodiments of the present disclosure, at least one of the voltage regulation modules 409, 427, and 433, which are part of the electronic device 400, may be included in the charging module 405. In another embodiment, at least one of the voltage regulation modules 409, 427, and 433, which are part of the electronic device 400, may be omitted. In yet another embodiment, the reception coil 423 may include the rectifying module 425. In yet another embodiment, the transmission coil 437 may include the inverter 435.

Figure 5A:
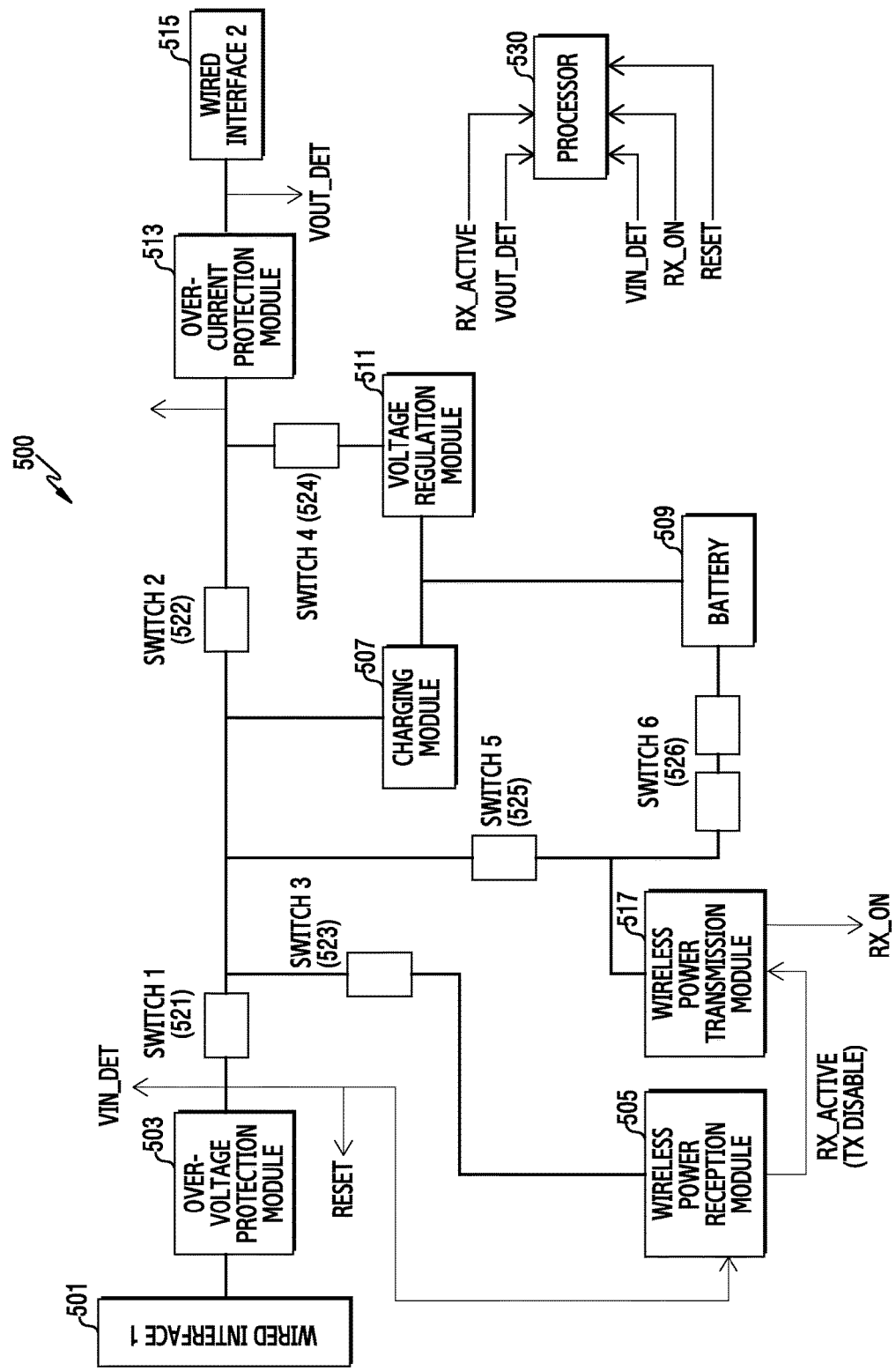
FIG. 5A is a diagram of an example of an electronic device, according to various embodiments of the present disclosure.
Figure 5B:
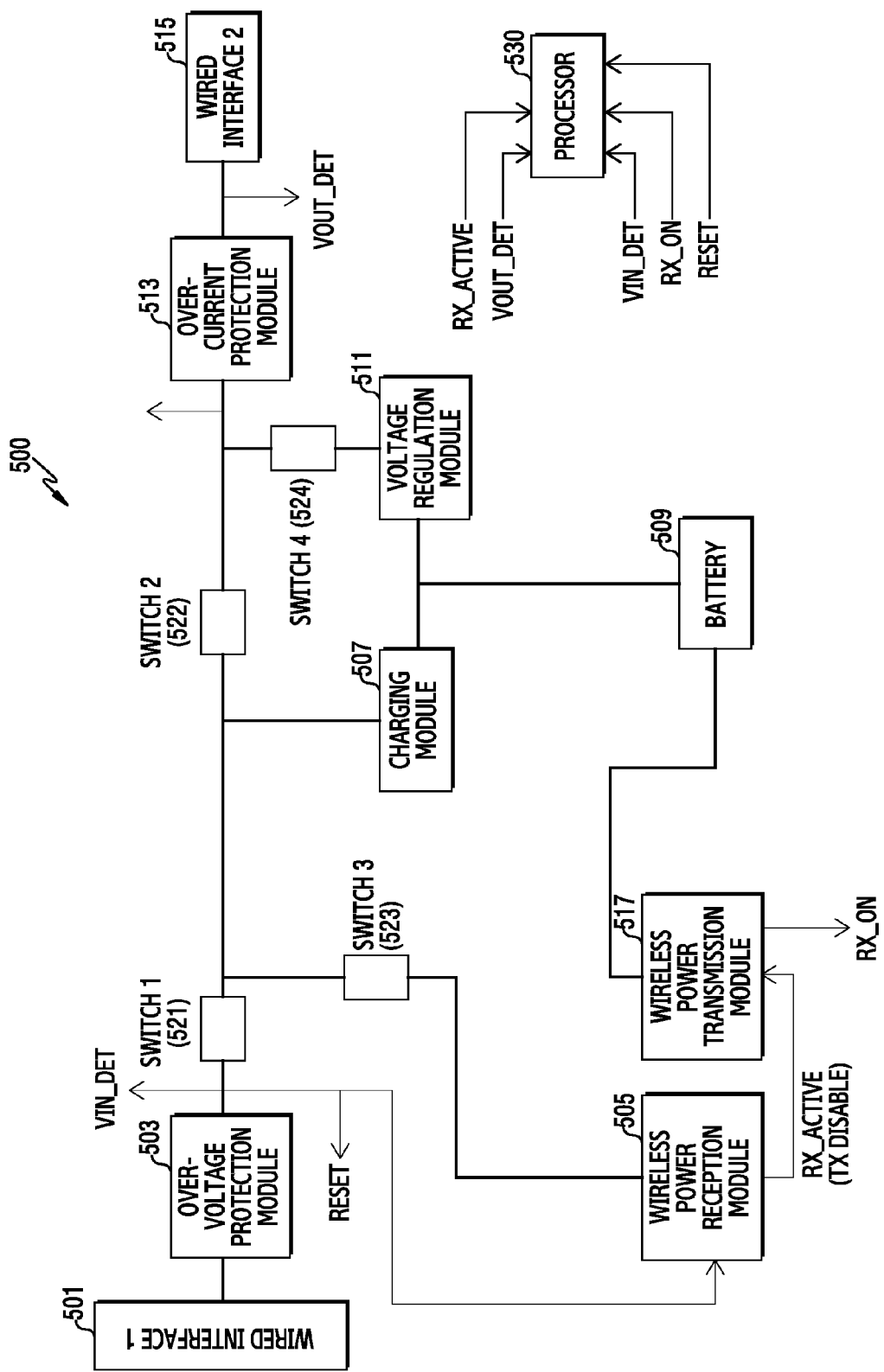
FIG. 5B is a diagram of an example of an electronic device, according to various embodiments of the present disclosure.

FIGS. 5A-B are diagrams of an example of an electronic device, according to various embodiments of the present disclosure. More particularly, FIGS. 5A and 5B illustrate transmission/reception path structures for wired and/or wireless charging of an electronic device, according to various embodiments of the present disclosure.

Referring to FIGS. 5A and 5B, the electronic device 500, according to the various embodiments of the present disclosure, may include wired interfaces 501, 515, an over-voltage protection module (VOP) 503, a wireless power reception module 505, a charging module 507, a battery 509, a voltage regulation module 511, an over-current protection module 513, a wireless power transmission module 517, a plurality of switches 521 to 526, and a processor 530. Detailed descriptions of modules that operate in the same way as the modules 401 to 437 included in the electronic device 400 of FIG. 4, among the modules 501 to 517 included in the electronic device 500, will be omitted in the following description.

The switches 521 to 526 of FIG. 5A may control a current flow under the control of the processor 530 (e.g., the processor 120 of FIG. 1) in order to correspond to a charging mode of the battery 509. For example, the switches 521 to 526 may be set to selectively open and short-circuit a battery charging path and a battery discharging path in order to correspond to the charging mode of the battery 509.

According to an embodiment, the processor 530 may recognize that external power is received through the wired interface 1 (501) in a wired manner, based on control signals (e.g., VIN_DET and RESET) associated with a power line that passes through the over-voltage protection module 503. The processor 530 may control the switches 521 to 526 in order to charge the battery and to supply wireless power and wired power by using the external power received through the wired interface 1 (501).

According to an embodiment, the processor 530 may recognize that the power of the battery 509 is supplied to an external device in a wired and/or wireless manner, based on a control signal (e.g., VOUT_DET) associated with a power line that passes through the over-current protection module 513 and a control signal (e.g., RX_ON) of the wireless power transmission module 517. The processor 530 may control the switches 521 to 526 in order to perform wireless power supply and/or wired power supply by using the power of the battery 509.

According to an embodiment, the processor 530 may recognize that external power is wirelessly received through the wireless power reception module 505, based on a control signal (RX_ACTIVE) of the wireless power reception module 505. The processor 530 may control the switches 521 to 526 in order to charge the battery and to supply power over a wired channel by using the external power that is received through the wireless power reception module 505.

According to various embodiments of the present disclosure, the processor 530 may identify a charging mode of the electronic device 500 by using the control signals as in Table 1, and may control the switches and the modules in order to correspond to the identified charging mode. For example, in Table 1, LOW and disable may represent a deactivated state of a relevant module, and HIGH and enable may represent an activated state of a relevant module.

TABLE 1

|  | Standby mode | Wired charging | Wired discharging | Wireless discharging | Wired/Wireless discharging | Wireless charging | Note |
| --- | --- | --- | --- | --- | --- | --- | --- |
| VIN_DET | LOW | HIGH | LOW | LOW | LOW | LOW | Identify charger input |
| RX_ACTIVE | LOW | LOW | HIGH | LOW | LOW | HIGH | Identify operation of wireless power reception module |
| VOUT_DET | LOW | X | HIGH | LOW | HIGH | X | Identify connection of external device at a discharging side |
| Switch 3 | LOW | LOW | LOW | LOW | LOW | HIGH | Connection path of wireless power reception module |
| Switch 5 | LOW | HIGH | LOW | LOW | LOW | LOW | Path for connection of charger input power to wireless power transmission module |
| Switch 6 | LOW | LOW | LOW | HIGH | HIGH | LOW | Connection path between internal battery power and wireless power transmission module |
| Wireless power reception module | Enable | Disable | Enable | Disable | Disable | Enable | Operating state of wireless power reception module |
| Wireless power transmission module | Disable | Enable | Disable | Enable | Enable | Disable | Operating state of wireless power transmission module |
| Charging module | Disable | Enable | Disable | Disable | Disable | Enable | Operating state of charging module |
| Voltage regulation module | Disable | Disable | Enable | Disable | Enable | Disable | Operating state of voltage regulation module |

Referring to FIG. 5B, the wireless power transmission module 517 may supply power, which is received from the battery 509, to an external device through a wireless power supply method.

The switches 521 to 524 may control a current flow under the control of the processor 530 (e.g., the processor 120 of FIG. 1) in order to correspond to a charging mode of the battery 509. For example, the switches 521 to 524 may be set to selectively open and short-circuit a battery charging path and a battery discharging path in order to correspond to the charging mode of the battery 509.

According to an embodiment, the processor 530 may recognize that external power is received through the wired interface 1 (501) in a wired manner, based on control signals (e.g., VIN_DET and RESET) associated with a power line that passes through the over-voltage protection module 503. The processor 530 may control the switches 521 to 524 in order to charge the battery and to supply power over a wired channel by using the external power that is received through the wired interface 1 (501).

According to an embodiment, the processor 530 may recognize that the power of the battery 509 is supplied to the external device in a wired and/or wireless manner, based on a control signal (e.g., VOUT_DET) associated with a power line that passes through the over-current protection module 513 and a control signal (e.g., RX_ON) of the wireless power transmission module 517. The processor 530 may control the switches 521 to 524 in order to supply power from the battery 509 wirelessly and/or over a wired channel. According to an embodiment, the processor 530 may recognize that external power is wirelessly received through the wireless power reception module 505, based on a control signal (RX_ACTIVE) of the wireless power reception module 505. The processor 530 may control the switches 521 to 524 in order to charge the battery and to supply wired power by using the external power that is received through the wireless power reception module 505.

According to various embodiments of the present disclosure, the processor 530 may identify a charging mode of the electronic device 500 by using the control signals as in Table 2, and may control the switches and the modules in order to correspond to the identified charging mode. For example, in Table 2, LOW and disable may represent a deactivated state of a relevant module, and HIGH and enable may represent an activated state of a relevant module.

TABLE 2

|  | Standby mode | Wired charging | Wired discharging | Wireless discharging | Wired/ Wireless discharging | Wireless charging | Note |
| --- | --- | --- | --- | --- | --- | --- | --- |
| VIN_DET | LOW | HIGH | LOW | LOW | LOW | LOW | Identify charger input |
| RX_ACTIVE | LOW | LOW | HIGH | LOW | LOW | HIGH | Identify operation of wireless power reception module |
| VOUT_DET | LOW | X | HIGH | LOW | HIGH | X | Identify connection of external device at a discharging side |
| Switch 3 | LOW | LOW | LOW | LOW | LOW | HIGH | Connection path of wireless power reception module |
| Wireless power reception module | Enable | Disable | Enable | Disable | Disable | Enable | Operating state of wireless power reception module |
| Wireless power transmission module | Disable | Enable | Disable | Enable | Enable | Disable | Operating state of wireless power transmission module |
| Charging module | Disable | Enable | Disable | Disable | Disable | Enable | Operating state of charging module |
| Voltage regulation module | Disable | Disable | Enable | Disable | Enable | Disable | Operating state of voltage regulation module |

According to various embodiments of the present disclosure, the electronic device 500 may be configured without the voltage regulation module 511.

According to various embodiments of the present disclosure, the electronic device may be configured to use the battery power or external power as illustrated in FIG. 5A, or to use the battery power as illustrated in FIG. 5B, when supplying power to an external device through a wireless power supply method.

According to various embodiments of the present disclosure, an electronic device may include: a housing; a battery that is mounted in the housing and contains a plurality of cells that are to be connected in series; a circuit electrically connected to the battery; and a conductive pattern electrically connected to the circuit in the interior of the housing, wherein the circuit may be configured to wirelessly receive power from a first external device through the conductive pattern, to charge at least some of the plurality of cells in the battery by using the power, to change a first voltage, which is generated by a series connection between at least two of the plurality of cells in the battery, into a second voltage that is lower than the first voltage, and to transmit power wirelessly based on the second voltage to a second external device through the conductive pattern.

According to various embodiments, the electronic device may further include: a processor in the housing; a display that is exposed through at least one side of the housing and is connected to the processor; and a memory electrically connected to the processor, wherein the memory may store instructions that allow the processor, when being executed, to receive a first signal from the second external device and to transmit the power based on the second voltage to the second external device by using the circuit at least partially based on the first signal.

According to various embodiments, the instructions may allow the processor to display at least one of the charging state of the battery and the charging state of a battery of the second external device on a part of the display.

According to various embodiments, the circuit may be configured to receive power from a third external device over a wired connection, to charge at least some of the plurality of cells in the battery by using the wiredly received power, to change a third voltage, which is generated by a series connection between at least two of the plurality of cells in the battery, into a fourth voltage that is lower than the third voltage, and to transmit power based on the fourth voltage to a fourth external device in a wired manner.

According to various embodiments, the circuit may be configured to transmit, to the fourth external device, at least some of the wiredly received power or the wirelessly received power.

According to various embodiments, the circuit may be configured to transmit at least some of the wiredly received power to the second external device and to prevent the wiredly received power from flowing into the conductive pattern.

According to various embodiments, the circuit may be configured to prevent the power transmitted to the second or fourth external device from flowing into the conductive pattern and the third external device.

According to various embodiments of the present disclosure, an electronic device may include: a housing; a battery that is mounted in the housing and contains a plurality of cells that are to be connected in series; a circuit electrically connected to the battery; and a conductive pattern electrically connected to the circuit in the interior of the housing, wherein the circuit may be configured to receive power wirelessly from a first external device through the conductive pattern, to charge at least some of the plurality of cells in the battery by using the power, to selectively connect at least two of the plurality of cells in the battery in series, and to transmit power wirelessly based on a first voltage, which is generated by the cells that are selectively connected in series, to a second external device through the conductive pattern.

According to various embodiments, the electronic device may further include: a processor in the housing; a display that is exposed through at least one side of the housing and is connected to the processor; and a memory electrically connected to the processor, wherein the memory may store instructions that allow the processor, when being executed, to receive a first signal from the second external device and to transmit the power based on the first voltage to the second external device by using the circuit at least partially based on the first signal.

According to various embodiments, the instructions may allow the processor to display at least one of the charging state of the battery and the charging state of a battery of the second external device on a part of the display.

According to various embodiments, the circuit may be configured to receive power from a third external device in a wired manner, to charge at least some of the plurality of cells in the battery by using the wiredly received power, to selectively connect at least two of the plurality of cells in the battery in series, and to transmit power based on a second voltage, which is generated by the cells that are selectively connected in series, to a fourth external device in a wired manner.

According to various embodiments, the circuit may be configured to transmit, to the fourth external device, at least some of the wiredly received power or the wirelessly received power.

According to various embodiments, the circuit may be configured to transmit at least some of the wiredly received power to the second external device and to prevent the wiredly received power from flowing into the conductive pattern.

According to various embodiments, the circuit may be configured to prevent the power transmitted to the second or fourth external device from flowing into the conductive pattern and the third external device.

According to various embodiments of the present disclosure, an electronic device may include: a housing; a first battery mounted in the housing; a circuit electrically connected to the first battery; and a processor electrically connected to the circuit, wherein the circuit may be configured to receive first power from a first external device in a wired or wireless manner, to separate the first power into second power and third power, to charge the first battery by using the second power, and to charge a second battery included in the second external device by transmitting the third power to the second external device, and the processor may be configured to determine a first amount of power, which is to be separated as the second power, among the first power and a second amount of power, which is to be separated as the third power, based on the result obtained by comparing a first charging variable for charging the first battery and a second charging variable for charging the second battery.

According to various embodiments, the first charging variable may include at least one of the residual quantity of the first battery, a charging completion time of the first battery, and the whole capacity of the first battery, and the second charging variable may include at least one of the residual quantity of the second battery, a charging completion time of the second battery, information on the connection with the second external device, information on the operating state of the second external device, and the whole charging capacity of the second battery.

According to various embodiments of the present disclosure, an electronic device may include: a housing; a battery that is mounted in the housing and contains a plurality of cells that are to be connected in series; and a circuit electrically connected to the battery, wherein the circuit may be configured to receive power from a first external device in a wired or wireless manner, to charge at least some of the plurality of cells in the battery by using the power, to generate a voltage by a series connection between at least two of the plurality of cells in the battery, and to transmit power based on the voltage, which is generated by the cells connected in series, to a second external device in a wired and/or wireless manner.

According to various embodiments, the circuit may be configured to transmit at least some of the wiredly or wirelessly received power to the second external device in a wired and/or wireless manner.

Figure 6:
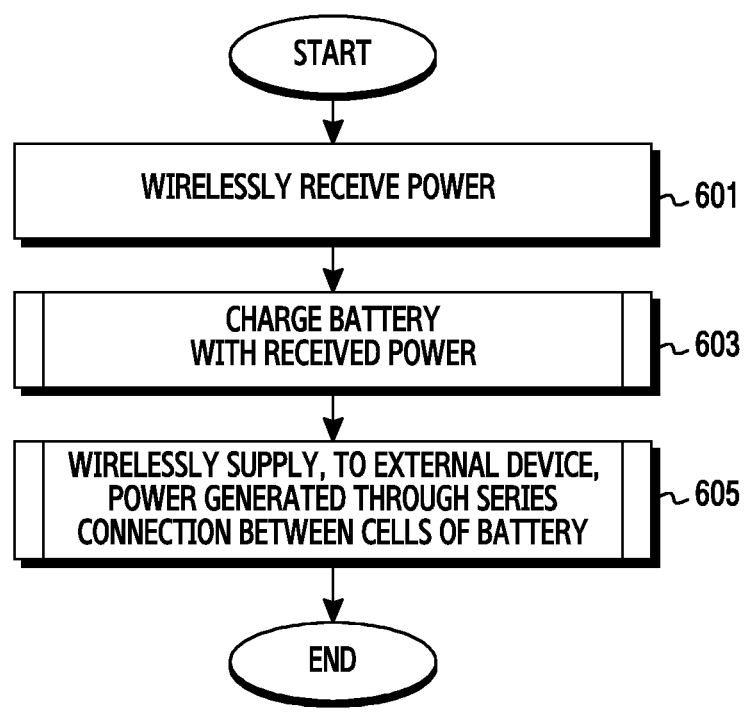
FIG. 6 is a flowchart of an example of a process, according to various embodiments of the present disclosure.

FIG. 6 is a flowchart of an example of a process, according to various embodiments of the present disclosure.

Referring to FIG. 6, in operation 601, the electronic device (e.g., the electronic device 101, 201, 400 or 500) may receive external power wirelessly. For example, the electronic device 400 or 500 may receive power from an external device that is wirelessly connected through the wireless power reception module 421 or 505.

In operation 603, the electronic device may charge the battery (e.g., the battery 190, 296, 407, or 509) of the electronic device with the wirelessly received power. For example, the electronic device 400 or 500 may charge a plurality of cells that are part of the battery 407 or 509 according to the connection state (e.g., series connection or parallel connection) of the corresponding cells.

In operation 605, the electronic device may wirelessly supply, to the external device, the power that is generated by connecting the cells of the battery in series. For example, the electronic device 400 or 500 may supply the power, which is generated by connecting, in series, at least two of the cells that are part of the battery, to the external device through the wireless power transmission module 431 or 517.

Figure 7:
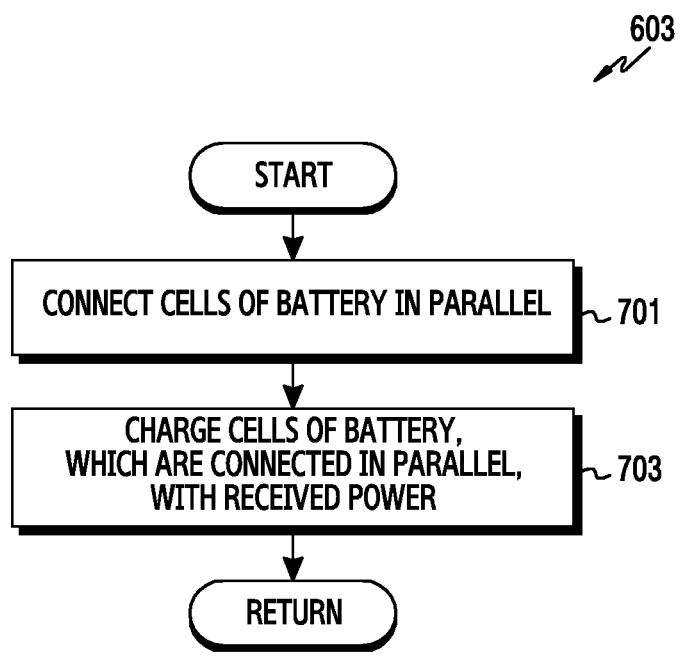
FIG. 7 is a flowchart of an example of a process, according to various embodiments of the present disclosure.

FIG. 7 is a flowchart of an example of a process, according to various embodiments of the present disclosure. Hereinafter, the operation of charging the battery in operation 603 of FIG. 6 will be described.

Referring to FIG. 7, in operation 701, the electronic device (e.g., the electronic device 101, 201, 400 or 500) may connect at least two cells included in the corresponding battery in parallel in order to charge the battery.

In operation 703, the electronic device may charge the at least two cells, which are connected in parallel, with the wirelessly received power. For example, the electronic device 400 or 500 may charge the battery 407 or 509 by supplying the power, which is wirelessly received through the charging module 405 or 507, to the at least two cells that are connected in parallel.

Figure 8:
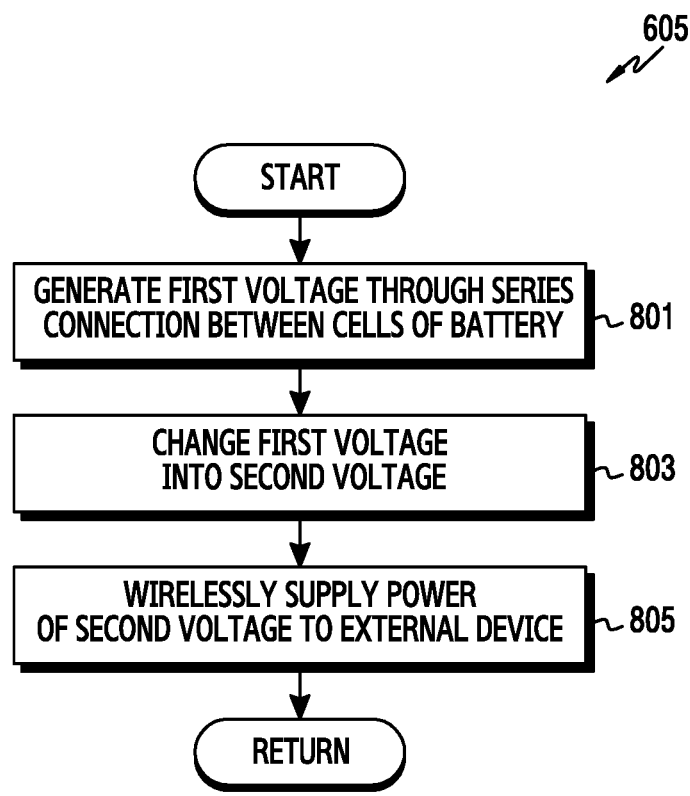
FIG. 8 is a flowchart of an example of a process, according to various embodiments of the present disclosure.

FIG. 8 is a flowchart of an example of a process, according to various embodiments of the present disclosure. Hereinafter, the operation of supplying the power to the external device in operation 605 of FIG. 6 will be described.

Referring to FIG. 8, in operation 801, the electronic device (e.g., the electronic device 101, 201, 400 or 500) may generate a first voltage by connecting at least two cells, which are part of the battery, in series. For example, the electronic device 400 or 500 may generate power of the first voltage that is obtained by adding voltages of the cells that are connected in series.

In operation 803, the electronic device may change the first voltage into a second voltage. For example, when the output voltage (the first voltage) of the battery 407 or 509 is generated to be higher than a reference voltage (the second voltage, for example, 5 V) through the series connection between the cells, the electronic device 400 or 500 may drop the output voltage of the battery 407 or 509 to the reference voltage. In this case, the electronic device 400 or 500 may use the voltage regulation module 409 or 511 in order to drop the output voltage of the battery 407 or 509 to the reference voltage.

In operation 805, the electronic device may supply the power of the second voltage to the external device in a wireless manner. For example, the electronic device 400 or 500 may supply the power of the second voltage to the external device through the wireless power transmission module 431 or 517.

Figure 9:
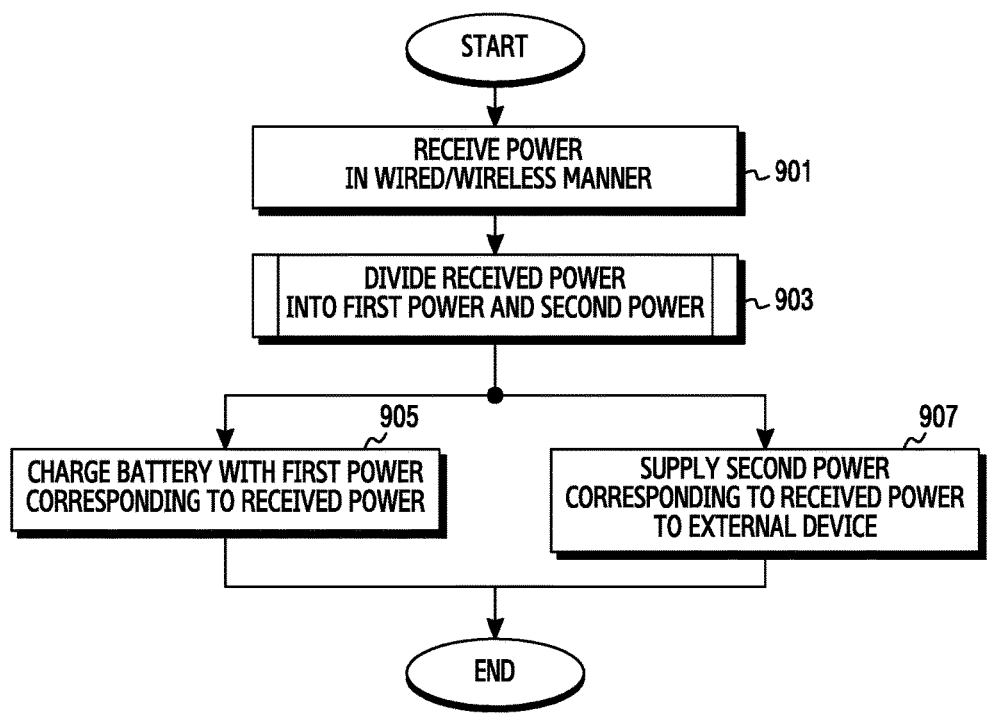
FIG. 9 is a flowchart of an example of a process, according to various embodiments of the present disclosure.

FIG. 9 is a flowchart of an example of a process, according to various embodiments of the present disclosure. Hereinafter, an operation of controlling battery charging by using screen configurations illustrated in FIGS. 10A and 10B will be described.

Referring to FIG. 9, in operation 901, the electronic device (e.g., the electronic device 101, 201, 400 or 500) may receive power for charging a battery over a wired and/or wireless channel. For example, the electronic device 400 or 500 may receive external power through the wired interface 1 (401 or 501) or the wireless power reception module 421 or 505.

In operation 903, the electronic device may divide the received power into first power and second power. For example, based on charging variables of the battery 407 or 509 and the external device, the electronic device 400 or 500 may divide the received power into the first power and the second power. Here, the charging variables may include at least one of battery charging completion time of the external device or the electronic device, the battery capacity (the whole battery capacity) of the external device or the electronic device, the battery residual quantity of the external device or the electronic device, information on the connection with the external device, a charging priority, the number of external devices that are connected to the electronic device, an amount of rechargeable power for a battery, and the operating state of the external device. The amount of rechargeable power for a battery may represent an amount of power that can be used to charge a battery per unit time by using external power. The operating state of the external device may include the characteristics (e.g., kinds, number, or service types) of application programs that are being executed in the external device.

Figure 10A:
FIG. 10A is a diagram of an example of a user interface, according to various embodiments of the present disclosure.

In operation 905, the electronic device may charge the battery with the first power that corresponds to the received power. For example, the electronic device may display the battery residual quantity 1001 thereof on at least a part of the display 160 as illustrated in FIG. 10A.

Figure 10B:
FIG. 10B is a diagram of an example of a user interface, according to various embodiments of the present disclosure.

In operation 907, the electronic device may supply, to the external device, the second power that corresponds to the received power. For example, the electronic device 400 or 500 may supply, to the external device, the second power through the wired interface 2 (413 or 515) or the wireless power transmission module 431 or 517 according to a method of supplying power to the external device (e.g., a wired or wireless method). In this case, the electronic device may display the battery residual quantity 1003 of the external device on at least a part of the display 160 as illustrated in FIG. 10B.

Figure 11:
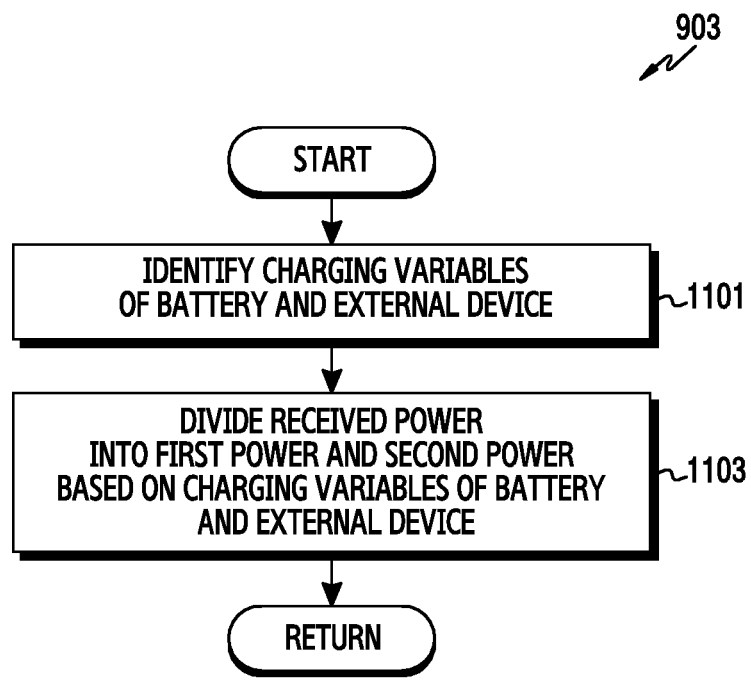
FIG. 11 is a flowchart of an example of a process, according to various embodiments of the present disclosure.

FIG. 11 is a flowchart of an example of a process, according to various embodiments of the present disclosure. Hereinafter, the operating method for dividing the received power into the first power and the second power in operation 903 of FIG. 9 will be described.

Referring to FIG. 11, in operation 1101, the electronic device (e.g., the electronic device 101, 201, 400 or 500) may identify charging variables of the battery and the external device. For example, the electronic device 400 or 500 may identify the charging variable of the external device through a control signal that is received from the external device connected thereto for power supply.

In operation 1103, the electronic device may divide the received power, which has been received wirelessly and/or over a wired channel, into the first power for the battery and the second power for the external device based on the charging variable of the battery and the charging variable of the external device. For example, the electronic device may divide the received power, which has been received wirelessly and/or over a wired channel, into pre-defined magnitudes of first and second power that correspond to the charging variable of the battery and the charging variable of the external device (e.g., the number of external devices), respectively. For example, the electronic device may divide the received power, which has been received wirelessly and/or over a wired channel, into the first power and the second power that have magnitudes determined by the charging variable of the battery and the charging variable of the external device. For example, the charging variable of the battery and the charging variable of the external device may be input by a user, or may be automatically collected by the electronic device.

Figure 12:
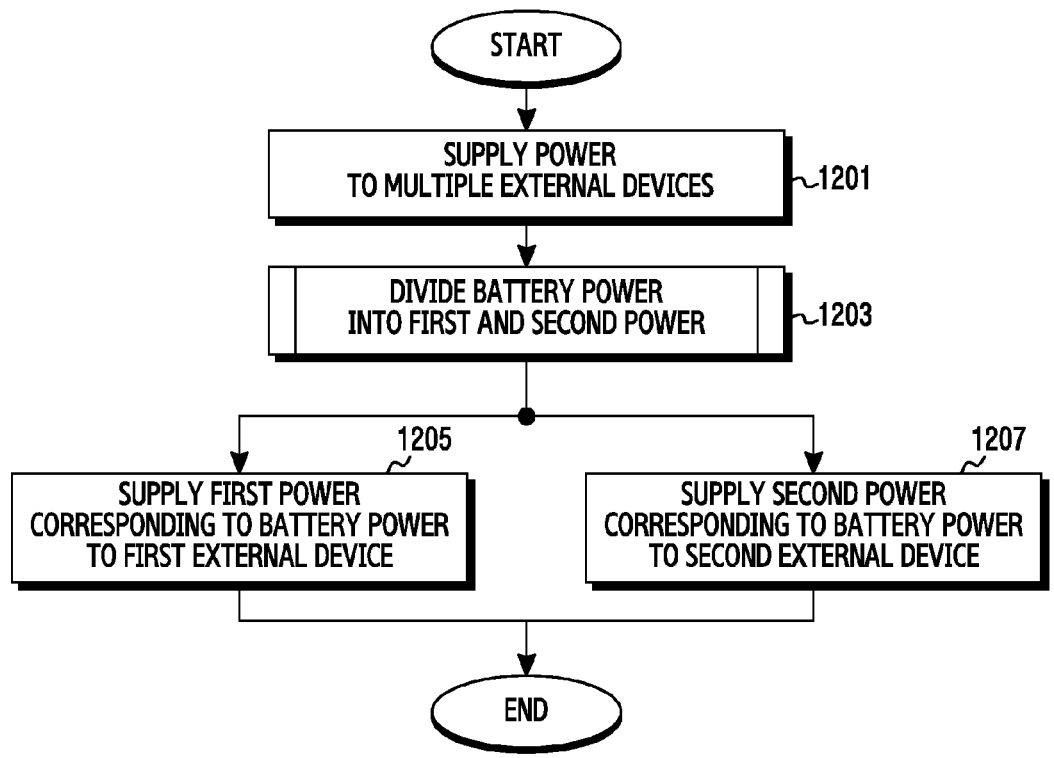
FIG. 12 is a flowchart of an example of a process, according to various embodiments of the present disclosure.

FIG. 12 is a flowchart of an example of a process, according to various embodiments of the present disclosure.

Referring to FIG. 12, in operation 1201, the electronic device (e.g., the electronic device 101, 201, 400, or 500) may be connected to the plurality of external devices in order to supply power thereto. For example, the electronic device 400 or 500 may be connected to the plurality of external devices in order to supply power thereto through at least one of wired and wireless connection methods.

In operation 1203, the electronic device may divide battery power into first power and second power that correspond to the external devices. For example, the electronic device 400 or 500 may divide the battery power thereof, which is to be provided to the external devices, into the first power and the second power based on charging variables of the respective external devices.

In operation 1205, the electronic device may supply, to a first external device, the first power that corresponds to the battery power. For example, the electronic device 400 or 500 may supply the first power to the first external device through the wired interface 2 (413 or 515) according to the method in which the electronic device is connected with the first external device. For example, the electronic device 400 or 500 may supply the first power to the first external device through the wireless power transmission module 431 or 517 according to the method in which the electronic device is connected with the first external device.

In operation 1207, the electronic device may supply, to a second external device, the second power that corresponds to the battery power. For example, the electronic device 400 or 500 may supply the second power to the second external device through the wired interface 2 (413 or 515) or the wireless power transmission module 431 or 517 according to the method in which the electronic device is connected with the second external device.

Figure 13:
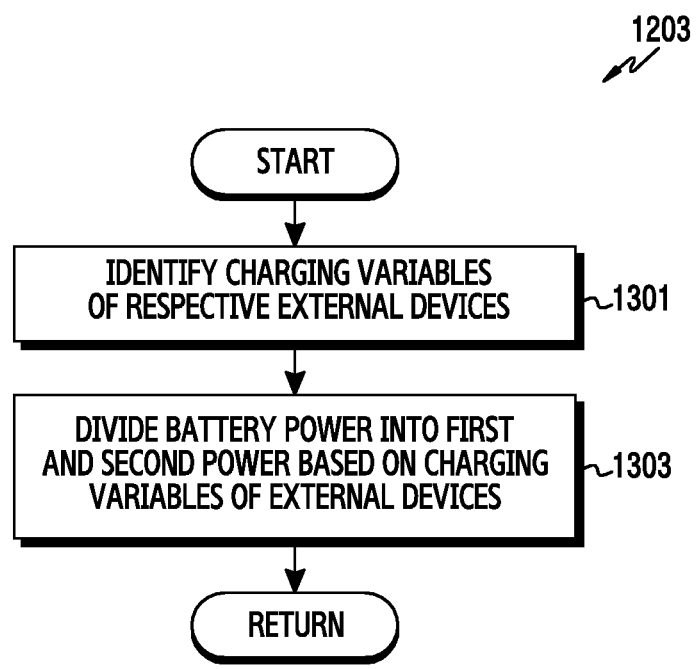
FIG. 13 is a flowchart of an example of a process, according to various embodiments of the present disclosure.

FIG. 13 is a flowchart of an example of a process, according to various embodiments of the present disclosure. Hereinafter, the operating method for dividing the battery power into the first power and the second power in operation 1203 of FIG. 12 will be described.

Referring to FIG. 13, in operation 1301, the electronic device (e.g., the electronic device 101, 201, 400 or 500) may identify charging variables of the respective external devices. For example, the electronic device 400 or 500 may receive charging variable information from each external device, which is connected thereto for power supply, in response to a request for the charging variable.

In operation 1303, the electronic device may divide the battery power into the first power for the first external device and the second power for the second external device based on the charging variables of the respective external devices. For example, the electronic device may divide the battery power into pre-defined magnitudes of first and second power that correspond to the charging variables of the external devices (e.g., the number of external devices). For example, the electronic device may divide the battery power into the first power and the second power that have magnitudes determined based on the charging variables of the external devices. For example, the charging variables of the external devices may be input by a user, or may be automatically collected by the electronic device.

Figure 14A:
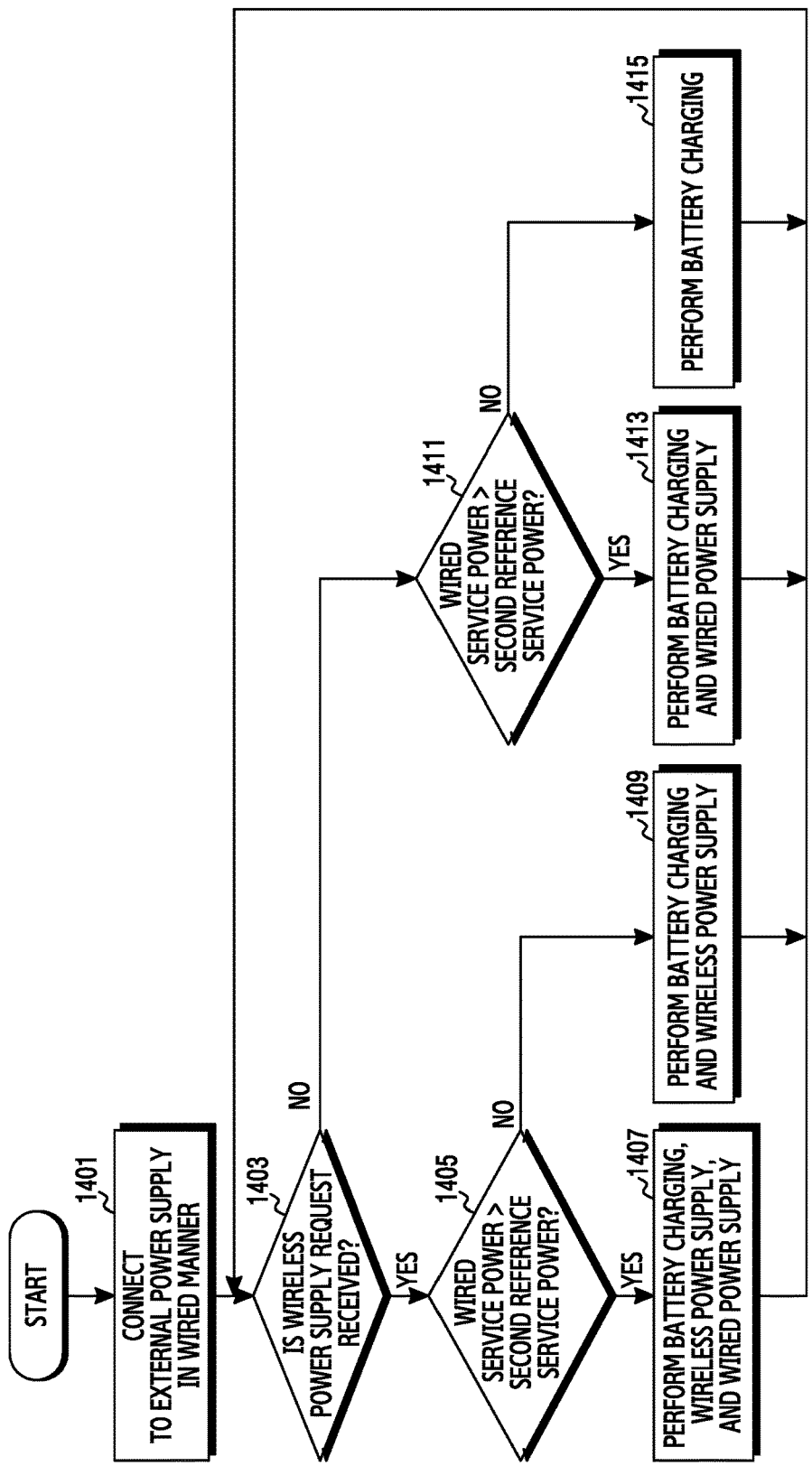
FIG. 14A is a flowchart of an example of a process, according to various embodiments of the present disclosure.

FIG. 14A is a flowchart of an example of a process for charging and discharging a battery in an electronic device by using wired power, according to various embodiments of the present disclosure. In the following description, the electronic device is assumed to be connected to an external power supply device through a Dedicated Charging Port (DCP) charging method.

Referring to FIG. 14A, in operation 1401, the electronic device (e.g., the electronic device 101, 201, 400, or 500) may be connected to the external power supply device (e.g., a Travel Adaptor (TA) charger or an auxiliary battery device) via a wired connection.

In operation 1403, the electronic device may detect whether a wireless power supply request signal is received from an external device. In another example, the electronic device 400 or 500 may detect whether information on access of the external device to a wireless charging pad of the electronic device 400 or 500 is received.

In operation 1405, the electronic device, when receiving the wireless power supply request signal from the external device, may detect whether wired service power exceeds second reference service power (e.g., 20 mA). For example, when wired power that exceeds the second reference service power is supplied through the wired interface 2 (413 or 515), the electronic device 400 or 500 may determine that an external device has been connected thereto in order to receive power through the wired interface 2 (413 or 515). Here, the wired service power may represent an amount of power that is supplied to the external device through the wired interface 2 (413 or 515).

In operation 1407, when the wired service power exceeds the second reference service power, the electronic device may charge the battery thereof and may perform wireless power supply and wired power supply by using the external power that has been received through the wired connection. For example, the electronic device 400 or 500 may control to supply, to the battery 407 or 509, external power that is received from the wired interface 1 (401 or 501). The electronic device 400 or 500 may supply the external power, which is received from the wired interface 1 (401 or 501), to at least one external device through the wired interface 2 (413 or 515) and the wireless power transmission module 431 or 517.

In operation 1409, when the wired service power is lower than or equal to the second reference service power, the electronic device may charge the battery thereof and may perform wireless power supply by using the external power that has been received through the wired connection. For example, when the wired service power is lower than or equal to the second reference service power, the electronic device may recognize that the battery of the external device that supplies power over a wired connection has been completely charged, or that the connection with the external device has been released. Accordingly, the electronic device 400 or 500 may supply the external power, which is received from the wired interface 1 (401 or 501), to the battery 407 or 509, or may supply the external power to at least one external device through the wireless power transmission module 431 or 517.

In operation 1411, when no wireless power supply request signal is received from the external device, the electronic device may detect whether wired service power exceeds the second reference service power.

In operation 1413, when the wired service power exceeds the second reference service power, the electronic device may charge the battery thereof and may perform wired power supply by using the external power that has been received through the wired connection. For example, the electronic device 400 or 500 may supply the external power, which is received from the wired interface 1 (401 or 501), to the battery 407 or 509, or may supply the external power to at least one external device through the wired interface 2 (413 or 515).

In operation 1415, when the wired service power is lower than or equal to the second reference service power, the electronic device may charge the battery thereof by using the external power that has been received through the wired connection. For example, the electronic device 400 or 500 may supply, to the battery 407 or 509, the external power that is received from the wired interface 1 (401 or 501).

According to various embodiments of the present disclosure, the electronic device may selectively charge the battery thereof based on a charging variable of the battery. For example, the electronic device 400 or 500 may identify the charging variable of the battery 407 or 509 when an external power supply device is connected thereto through the wired interface 1 (401 or 501). The electronic device 400 or 500 may determine whether to charge the battery 407 or 509 based on the charging variable of the battery 407 or 509.

According to an embodiment, the electronic device 400 or 500, when determining not to charge the battery 407 or 509, may perform at least one of the wireless power supply and the wired power supply based on whether the wireless power supply request signal is received (operation 1403) and based on the magnitude of the wired service power (operation 1405 or 1411).

According to various embodiments of the present disclosure, the electronic device may selectively perform at least one of the battery charging, the wireless power supply, and the wired power supply based on at least one of the state information of the external power supply device, a charging variable of an external device connected thereto in a wireless or wired manner, and a charging variable of the battery thereof. Here, the state information of the external power supply device may include at least one of the type of the external power supply device and an amount of external power.

Figure 14B:
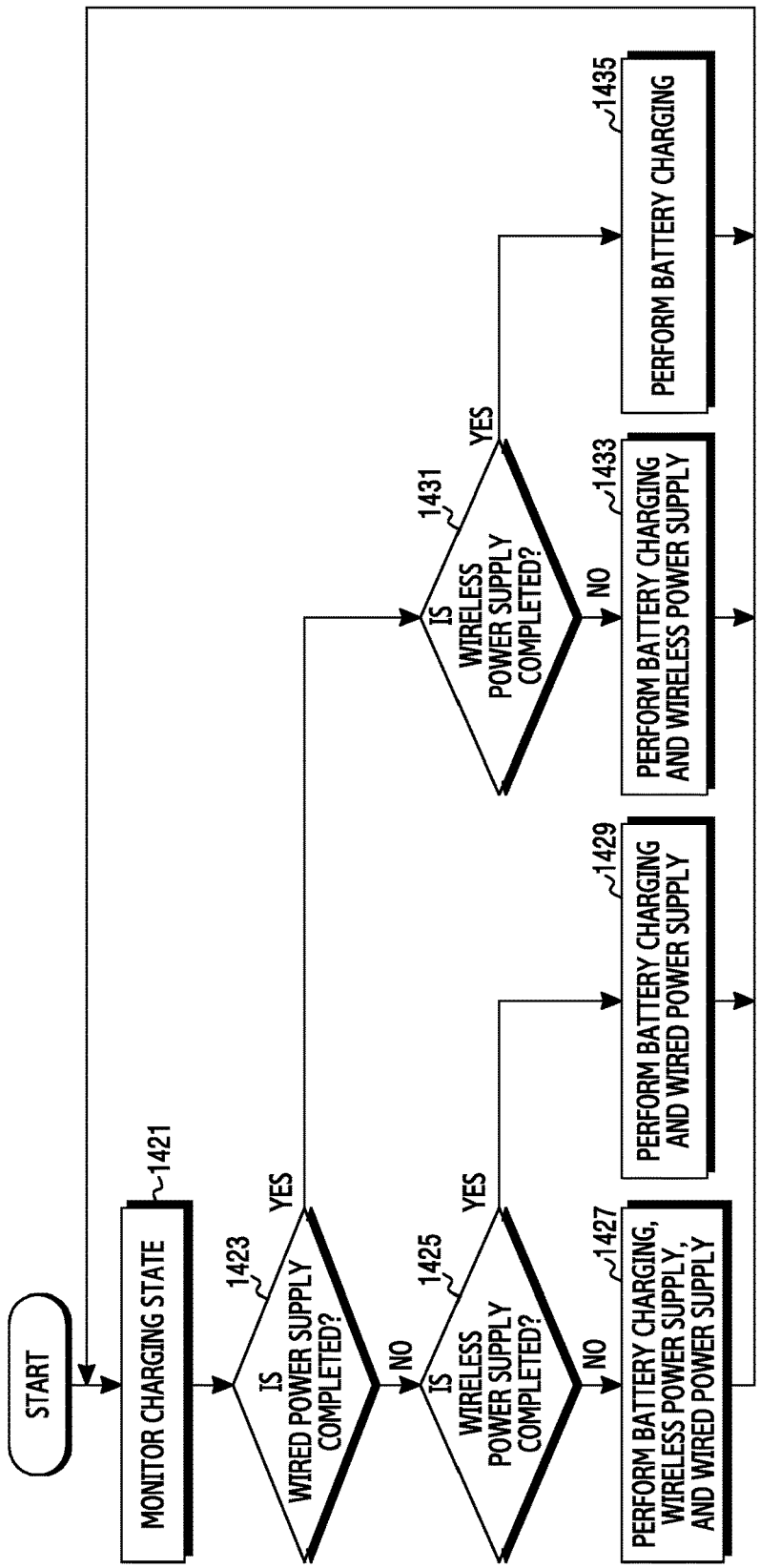
FIG. 14B is a flowchart of an example of a process, according to various embodiments of the present disclosure.

FIG. 14B is a flowchart of an example of a process for selectively performing wired/wireless power supply by an electronic device based on a charging state thereof, according to various embodiments of the present disclosure. In the following description, the electronic device is assumed to be connected to an external power supply device through a Dedicated Charging Port (DCP) charging method.

Referring to FIG. 14B, in operation 1421, the electronic device (e.g., the electronic device 101, 201, 400 or 500) may monitor a state in which the electronic device is charged by external power that is received over a wired connection. For example, the electronic device 400 or 500 may monitor the states of the battery charging, the wireless power supply, and the wired power supply, which are performed by the electronic device in operation 1407 of FIG. 14A.

In operation 1423, based on the monitoring result on the charging state thereof, the electronic device may detect whether the wired power supply is completed. For example, based on wired service power through the wired interface 2 (413 or 515), the electronic device 400 or 500 may detect whether the wired power supply is completed. By way of example, when the wired service power is lower than or equal to a second reference service power, the electronic device 400 or 500 may determine that the wired power supply has been completed. For example, based on the connection of an external device with the wired interface 2 (413 or 515), the electronic device 400 or 500 may detect whether the wired power supply is completed. By way of example, when the connection of the external device with the wired interface 2 (413 or 515) is released, the electronic device 400 or 500 may determine that the wired power supply has been completed.

In operation 1425, when the wired power supply is not completed, the electronic device may detect whether wireless power supply is completed. For example, the electronic device 400 or 500 may detect whether a charging completion signal (e.g., CS100) is received from an external device that supplies wireless power. By way of example, the electronic device 400 or 500, when receiving the charging completion signal, may determine that the wireless power supply has been completed. For example, based on the connection with the external device that supplies the wireless power, the electronic device 400 or 500 may detect whether the wireless power supply is completed. By way of example, when the connection with the external device that supplies the wireless power is released, the electronic device 400 or 500 may identify that the wireless power supply has been completed.

In operation 1427, when the wired power supply and the wireless power supply are not completed, the electronic device may charge the battery thereof and may perform wireless power supply and wired power supply by using the external power that has been received through the wired connection. For example, the electronic device 400 or 500 may continually perform the battery charging, the wireless power supply, and the wired power supply using the external power received from the wired interface 1 (401 or 501).

In operation 1429, when the wired power supply is not completed, and the wireless power supply has been completed, the electronic device may charge the battery thereof and may perform wired power supply by using the external power that has been received through the wired connection. For example, the electronic device 400 or 500 may supply the external power, which is received from the wired interface 1 (401 or 501), to the battery 407 or 509, or may supply the external power to at least one external device through the wired interface 2 (413 or 515).

In operation 1431, when the wired power supply has been completed, the electronic device may detect whether wireless power supply is completed.

In operation 1433, when the wired power supply has been completed, and the wireless power supply is not completed, the electronic device may charge the battery thereof and may perform wireless power supply by using the external power that has been received through the wired connection. For example, the electronic device 400 or 500 may supply the external power, which is received from the wired interface 1 (401 or 501), to the battery 407 or 509, or may supply the external power to at least one external device through the wireless power transmission module 431 or 517.

In operation 1435, when the wired power supply and the wireless power supply have been completed, the electronic device may charge the battery thereof by using the external power that has been received through the wired connection. For example, the electronic device 400 or 500 may supply, to the battery 407 or 509, the external power received from the wired interface 1 (401 or 501).

According to various embodiments of the present disclosure, the electronic device may selectively supply external power to the battery thereof based on whether the battery is completely charged. For example, when the battery 407 or 509 has been completely charged by the external power received through the wired interface 1 (401 or 501), the electronic device 400 or 500 may cut off the external power supply to the battery 407 or 509.

According to an embodiment, when the battery 407 or 509 has been completely charged, the electronic device 400 or 500 may continually perform at least one of the wireless power supply and the wired power supply based on whether the wired power supply is completed (operation 1423) and based on whether the wireless power supply is completed (operation 1425 or 1431).

According to various embodiments of the present disclosure, when the connection with the external power supply device is released while the electronic device performs at least one of the battery charging, the wireless power supply, and the wired power supply, the electronic device may complete the ongoing charging operation.

According to various embodiments of the present disclosure, when the connection with the external power supply device is released while the electronic device performs at least one of the battery charging, the wireless power supply, and the wired power supply, the electronic device may maintain at least one of the wireless power supply and the wired power supply by using the battery power thereof. For example, the electronic device may control to maintain at least one of the wireless power supply and the wired power supply based on the residual quantity of the battery thereof.

Figure 15:
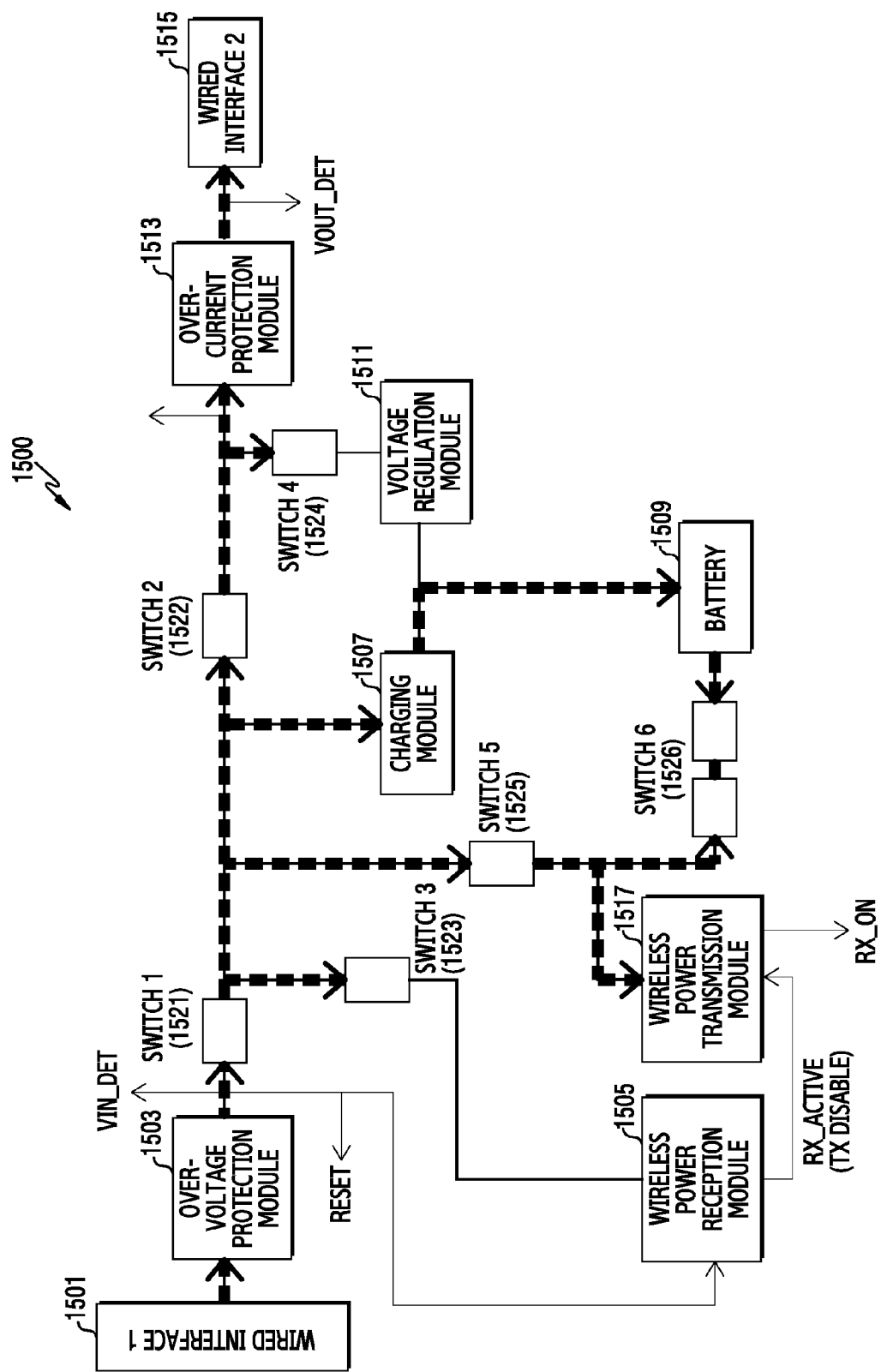
FIG. 15 is a diagram of an example of an electronic device, according to various embodiments of the present disclosure.

FIG. 15 is a diagram of an example of an electronic device, according to various embodiments of the present disclosure. Hereinafter, a current flow for performing the battery charging, the wired power supply, and the wireless power supply by using the external power received through the wired connection in operation 1407 of FIG. 14 will be described.

Referring to FIG. 15, the electronic device 1500 (e.g., the electronic device 500), when being connected to an external power supply device through a wired interface 1 (1501) (e.g., the wired interface 1 (501)), may control switches 1521 to 1526 to perform the battery charging, the wireless power supply, and the wired power supply.

According to an embodiment, the switch 1 (1521) (e.g., the switch 1 (521)) may be activated (turned on) in order to supply external power, which is received through the wired interface 1 (1501), into the electronic device 1500.

According to an embodiment, the electronic device 1500 may include an input current limiting module 1 that is located at the front or rear end of the switch 1 (1521). For example, the input current limiting module 1 may prevent an over-current caused by the external power, which is received through the wired interface 1 (1501), from flowing into the electronic device 1500. By way of example, the input current limiting module 1 may prevent a current that exceeds a current limit value, which is received from a processor (e.g., the processor 120, 210, or 530), from flowing into the electronic device 1500. The processor may set the current limit value of the input current limiting module 1 based on a current required by the electronic device 1500.

According to an embodiment, the switch 2 (1522) (e.g., the switch 2 (522)) may be activated in order to supply the external power, which is received through the wired interface 1 (1501), to a wired interface 2 (1515) (e.g., the wired interface 2 (515)).

According to an embodiment, the electronic device 1500 may include an input current limiting module 2 that is located at the front or rear end of the switch 2 (1522). For example, the input current limiting module 2 may prevent the over-current caused by the external power, which is received through the wired interface 1 (1501), from flowing into an external device that is connected to the electronic device through the wired interface 2 (1515). By way of example, the input current limiting module 2 may prevent a current that exceeds a current limit value, which is received from the processor, from flowing into the external device. The processor may set the current limit value of the input current limiting module 2 based on a current required by the external device that is connected to the wired interface 2 (1515).

According to an embodiment, the switch 3 (1523) (e.g., the switch 3 (523)) may be deactivated (turned off) in order to prevent the external power, which is received through the wired interface 1 (1501), from flowing into a battery charging path by a wireless power reception module 1505 (e.g., the wireless power reception module 505).

According to an embodiment, the switch 4 (1524) (e.g., the switch 4 (524) may be deactivated in order to prevent the external power, which is received through the wired interface 1 (1501), from flowing into a battery discharging path.

According to an embodiment, the switch 5 (1525) (e.g., the switch 5 (525) may be activated in order to supply the external power, which is received through the wired interface 1 (1501), to a wireless power transmission module (1517) (e.g., the wireless power transmission module 517).

According to an embodiment, the electronic device 1500 may include an input current limiting module 3 that is located at the front or rear end of the switch 5 (1525). For example, the input current limiting module 3 may prevent the over-current caused by the external power, which is received through the wired interface 1 (1501), from flowing into the wireless power transmission module 1517. By way of example, the input current limiting module 3 may prevent a current that exceeds a current limit value, which is received from the processor, from flowing into the wireless power transmission module 1517. The processor may set the current limit value of the input current limiting module 3 based on a current required by the wireless power transmission module 1517.

According to an embodiment, the switch 6 (1526) (e.g., the switch 6 (526)) may be set such that the external power received through the wired interface 1 (1501) does not flow into the battery discharging path, and the power of a battery 1509 (e.g., the battery 509) is supplied to the wireless power transmission module 1517.

According to an embodiment, the electronic device 1500 may include an input current limiting module 4 that is located at the front or rear end of a charging module 1507. For example, the input current limiting module 4 may prevent the over-current caused by the external power, which is received through the wired interface 1 (1501), from flowing into the battery 1509. By way of example, the input current limiting module 4 may prevent a current that exceeds a current limit value, which is received from the processor, from flowing into the battery 1509. The processor may set the current limit value of the input current limiting module 4 based on a current required by the battery 1509.

According to various embodiments of the present disclosure, the electronic device 1500 may prevent the over-current caused by the external power from flowing into the external device, which is connected to the electronic device through the wired interface 2 (1515), by using at least one of the input current limiting module 2 and an over-current protection module 1513.

Figure 16:
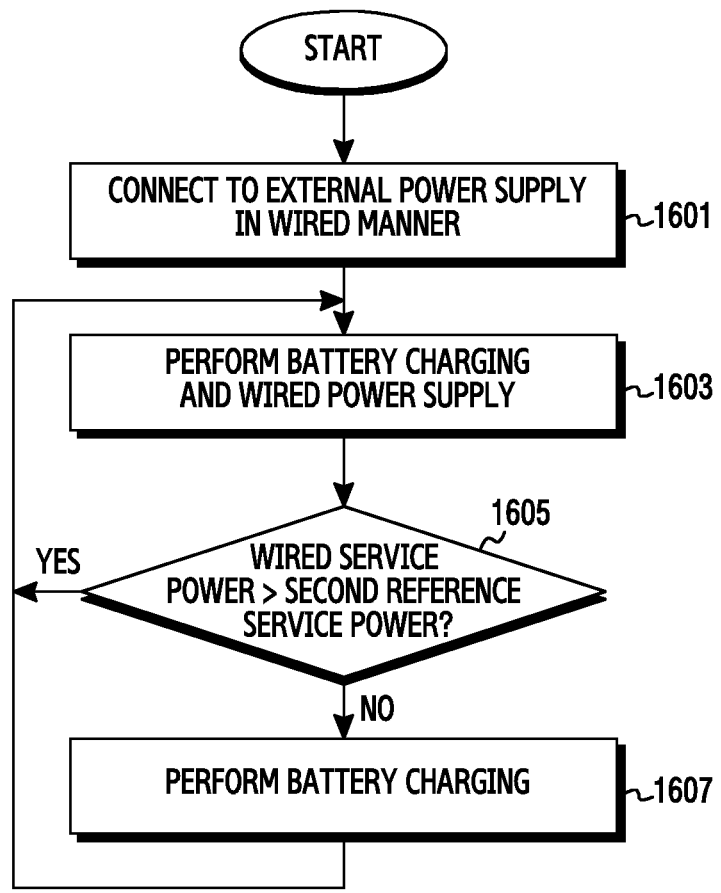
FIG. 16 is a flowchart of an example of a process, according to various embodiments of the present disclosure.

FIG. 16 is a flowchart of an example of a process for charging and discharging a battery in an electronic device by using wired power, according to various embodiments of the present disclosure.

Referring to FIG. 16, in operation 1601, the electronic device (e.g., the electronic device 101, 201, 400 or 500) may be connected to an external power supply device via a wired connection. For example, the electronic device 400 or 500 may be connected to the external power supply device through the wired interface 1 (401 or 501) in a Standard Downstream Port (SDP) charging method.

In operation 1603, the electronic device may charge the battery thereof and may supply wired power by using external power received from the external power supply device. For example, when the electronic device 400 or 500 is connected to the external power supply device in the SDP charging method, the electronic device 400 or 500 may determine that the electronic device cannot supply power wirelessly by using the power received from the external power supply device. Accordingly, the electronic device 400 or 500 may perform the battery charging and the wired power supply by using the external power received over a wired connection.

In operation 1605, the electronic device may compare wired service power with second reference service power to detect whether the wired service power exceeds the second reference service power. For example, when it is determined that the wired service power is lower than or equal to the second reference service power, the electronic device 400 or 500 may determine that the battery of an external device, which is connected to the electronic device through the wired interface 2 (413 or 515), has been completely charged. When it is determined that the wired service power exceeds the second reference service power, the electronic device 400 or 500 may determine that the battery of the external device, which is connected to the electronic device through the wired interface 2 (413 or 515), is not completely charged.

In cases where the wired service power exceeds the second reference service power, the electronic device may perform the battery charging and the wired power supply by using the external power received over a wired connection in operation 1603. In this case, the electronic device may detect whether to continually maintain the wired power supply in operation 1605 again.

In operation 1607, when the wired service power is lower than or equal to the second reference service power, the electronic device may perform the battery charging by using the external power received through the wired connection. For example, when the wired service power is lower than or equal to the second reference service power, the electronic device 400 or 500 may determine that the battery of the external device has been completely charged, and may stop supplying the wired power, or may supply lower power to the external device.

The electronic device may identify detect the wired service power exceeds the second reference service power in operation 1605 again. For example, the electronic device may detect whether to restart the wired power supply while charging the battery by using the external power received through the wired connection.

Figure 17:
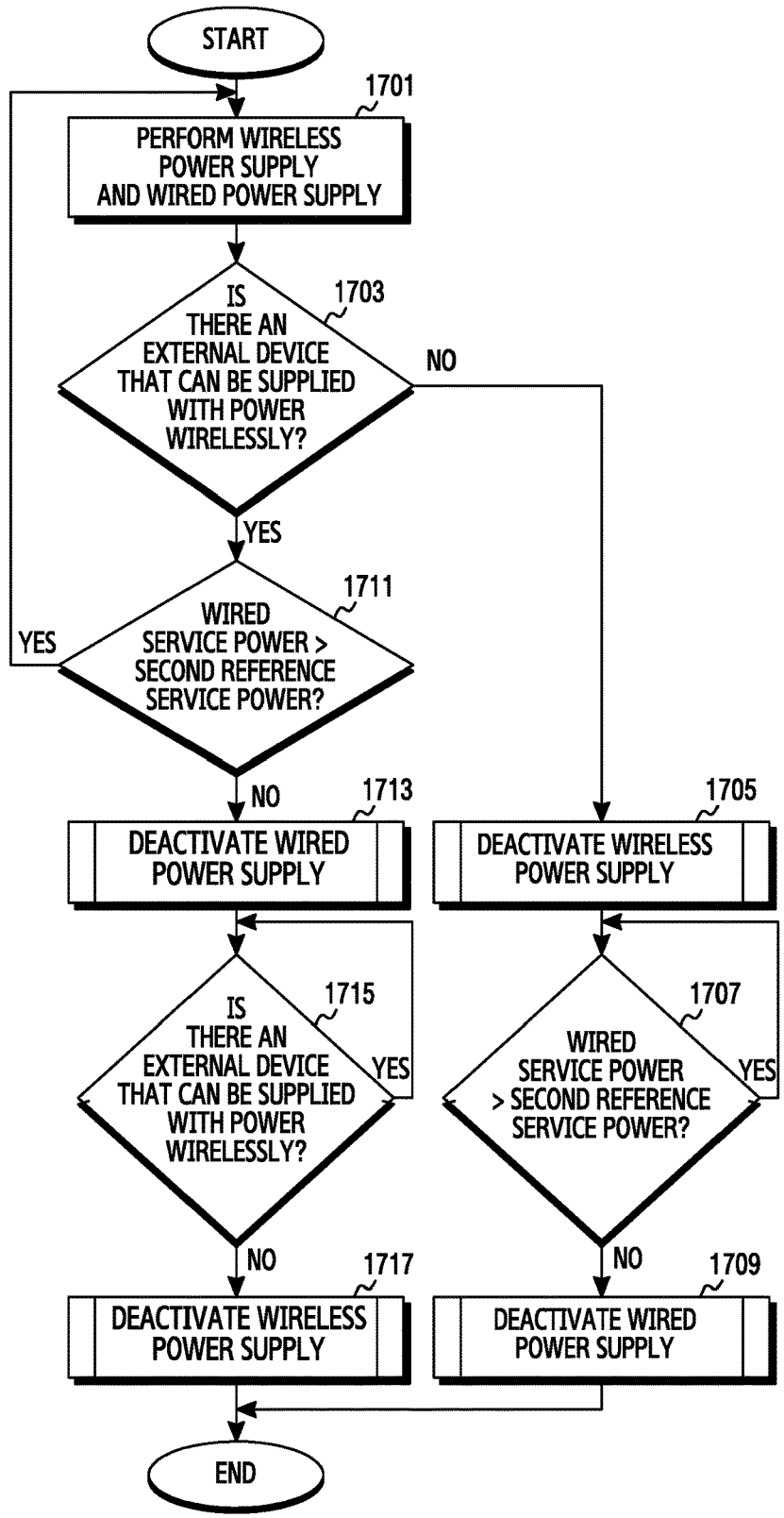
FIG. 17 is a flowchart of an example of a process, according to various embodiments of the present disclosure.

FIG. 17 is a flowchart of an example of a process for supplying power over a wired or wireless channel by using the power of a battery in an electronic device, according to various embodiments of the present disclosure.

Referring to FIG. 17, in operation 1701, the electronic device (e.g., the electronic device 101, 201, 400 or 500) may perform wireless power supply and wired power supply by using the power of a battery thereof. For example, the electronic device 400 or 500 may supply the battery power to at least one external device that is connected thereto through the wired interface 2 (413 or 515). The electronic device 400 or 500 may supply the battery power to at least one external device through the wireless power transmission module 431 or 517.

In operation 1703, the electronic device may detect whether an external device exists that can be supplied with power wirelessly. For example, the electronic device 400 or 500 may detect whether a wireless power supply request signal is received from an external device. By way of example, the electronic device 400 or 500, when receiving a wireless power supply request signal, may determine that an external device exists that can be supplied with power wirelessly. In another example, the electronic device 400 or 500 may detect whether an external device connects to a wireless charging pad thereof. By way of example, when an external device connects to the wireless charging pad, the electronic device 400 or 500 may determine that an external device exists that can be supplied with power wirelessly. In yet another example, the electronic device 400 or 500 may detect whether the battery of an external device to be supplied with power wirelessly has been completely charged. By way of example, when the battery of an external device is not completely charged, the electronic device 400 or 500 may determine that an external device exists that can be supplied with power wirelessly.

In operation 1705, when there is no external device that can be supplied with power wirelessly, the electronic device may deactivate the wireless power supply. For example, when an external device that can be supplied with power wirelessly cannot be identified for a first reference time period (e.g., 30 seconds), the electronic device 400 or 500 may deactivate the wireless power transmission module 431 or 517. In this case, the electronic device 400 or 500 may maintain the wired power supply.

In operation 1707, the electronic device may compare the wired service power with second reference service power to detect whether the wired service power exceeds the second reference service power. For example, the electronic device may compare the wired service power and the second reference service power to determine whether to maintain the wired power supply. Namely, based on the magnitude of the wired service power, the electronic device may detect whether an external device exists that can be supplied with power over a wired connection.

The electronic device may determine to maintain the wired power supply when the wired service power exceeds the second reference service power. Accordingly, in operation 1707, the electronic device may compare the wired service power and the second reference service power while the wireless power supply is deactivated, and may determine whether to maintain the wired power supply again.

In operation 1709, when the wired service power is lower than or equal to the second reference service power, the electronic device may deactivate the wired power supply. For example, when the wired service power is lower than or equal to the second reference service power, the electronic device may determine that the connection with the external device to be supplied with power in a wired manner has been released, or the battery of the external device has been completely charged. Accordingly, when the wired service power is lower than or equal to the second reference service power for a second reference time (e.g., one minute), the electronic device 400 or 500 may deactivate battery discharging using a wired connection.

In operation 1711, when there is no external device that can be supplied with power wirelessly, the electronic device may detect whether the wired service power exceeds the second reference service power.

The electronic device may maintain the wireless power supply and the wired power supply in operation 1701 when the wired service power exceeds the second reference service power. For example, when the wired service power exceeds the second reference service power, the electronic device 400 or 500 may determine that an external device to be supplied with power in a wired manner exists. Accordingly, the electronic device 400 or 500 may maintain the wired power supply to the external device.

In operation 1713, when the wired service power is lower than or equal to the second reference service power, the electronic device may deactivate the wired power supply. For example, when the power supplied to the external device through the wired interface 2 (413 or 515) for the second reference time is lower than or equal to the second reference service power, the electronic device 400 or 500 may determine that the wired power supply is completed. Accordingly, the electronic device 400 or 500 may cut off the power supply to the wired interface 2 (413 or 515) while maintaining the wireless power supply.

In operation 1715, in order to determine whether to maintain the wireless power supply, the electronic device may detect whether an external device exists that can be supplied with power wirelessly. For example, the electronic device 400 or 500 may detect whether an external device, the battery of which is not completely charged, exists among external devices that are wirelessly connected thereto.

The electronic device may maintain the wireless power supply in an active state when an external device exists that can be supplied with power wirelessly. Accordingly, the electronic device may again detect whether there is an external device that can be supplied with power wirelessly, in operation 1715.

In operation 1717, when there is no external device that can be supplied with power wirelessly, the electronic device may deactivate the wireless power supply. For example, when there is no external device that can be supplied with power wirelessly, the electronic device 400 or 500 may determine that the connection with an external device that can be supplied with power wirelessly has been released, or the battery of the external device has been completely charged. Accordingly, when an external device that can be supplied with power in wirelessly cannot be detected for the first reference time period (e.g., 30 seconds), the electronic device 400 or 500 may cut off the supply of power to the wireless power transmission module 431 or 517.

The electronic device, according to the various embodiments of the present disclosure, may perform the operation 1701 again before completing the power supply to the external device when the state of the external device that receives power via a wired or wireless connection is changed. For example, the change of state of the external device may include a case where the external device, which is connected to the electronic device in a wireless or wired manner, requires power supply since the external device is discharged after being fully charged, or a case where the external device is connected to the electronic device again after being disconnected therefrom.

Figure 18:
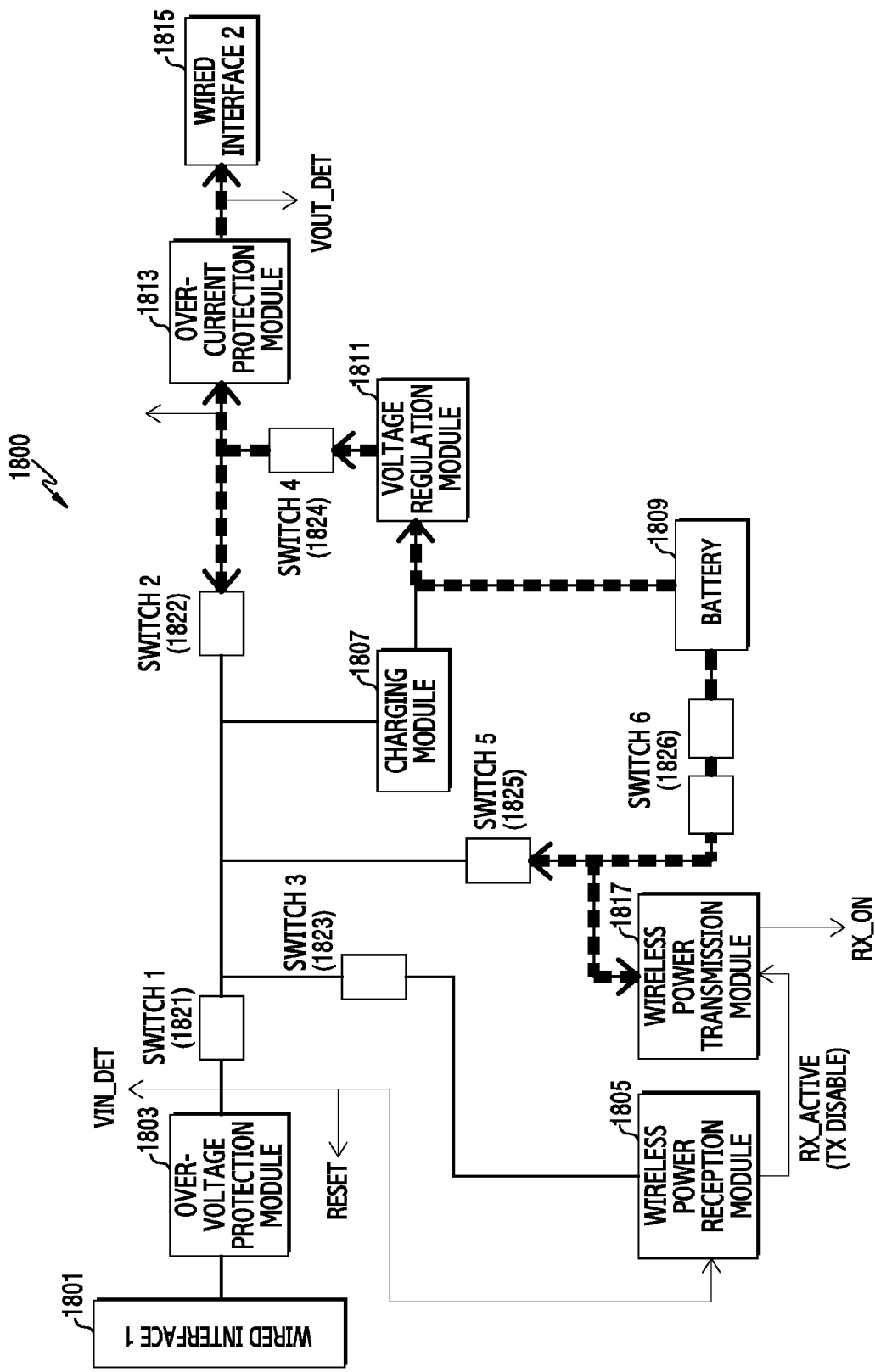
FIG. 18 is a diagram of an example of an electronic device, according to various embodiments of the present disclosure.

FIG. 18 is a diagram of an example of an electronic device, according to various embodiments of the present disclosure. In the discussion with respect to FIG. 18, a current flow for performing the wired power supply and the wireless power supply by using the battery power in operation 1701 of FIG. 17 will be described.

Referring to FIG. 18, the electronic device 1800 (e.g., the electronic device 500) may control switches 1821 to 1826 in order to perform wireless power supply and wired power supply by using the power of a battery 1809 thereof (e.g., the battery 509).

According to an embodiment, the switch 1 (1821) (e.g., the switch 1 (521)) may be deactivated in order to prevent the power of the battery 1809 from flowing into a wired interface 1 (1801) (e.g., the wired interface 1 (501)).

According to an embodiment, the switch 2 (1822) (e.g., the switch 2 (522)) may be deactivated in order to prevent the power of the battery 1809, which is supplied to a wired interface 2 (1815) (e.g., the wired interface 2 (515)), from flowing into a battery charging path by the wired interface 1 (1801).

According to an embodiment, the switch 3 (1823) (e.g., the switch 3 (523)) may be deactivated in order to prevent the power of the battery 1809 from flowing into a battery charging path by a wireless power reception module 1805 (e.g., the wireless power reception module 505).

According to an embodiment, the switch 4 (1824) (e.g., the switch 4 (524)) may be activated in order to supply the power of the battery 1809 to the wired interface 2 (1815).

According to an embodiment, the switch 5 (1825) (e.g., the switch 5 (525)) may be deactivated in order to prevent the power of the battery 1809, which is supplied to a wireless power transmission module 1817 (e.g., the wireless power transmission module 517), from flowing into a wired power supply path for the wireless power transmission module 1817.

According to an embodiment, the switch 6 (1826) (e.g., the switch 6 (526)) may be activated in order to supply the power of the battery 1809 to the wireless power transmission module 1817.

Figure 19:
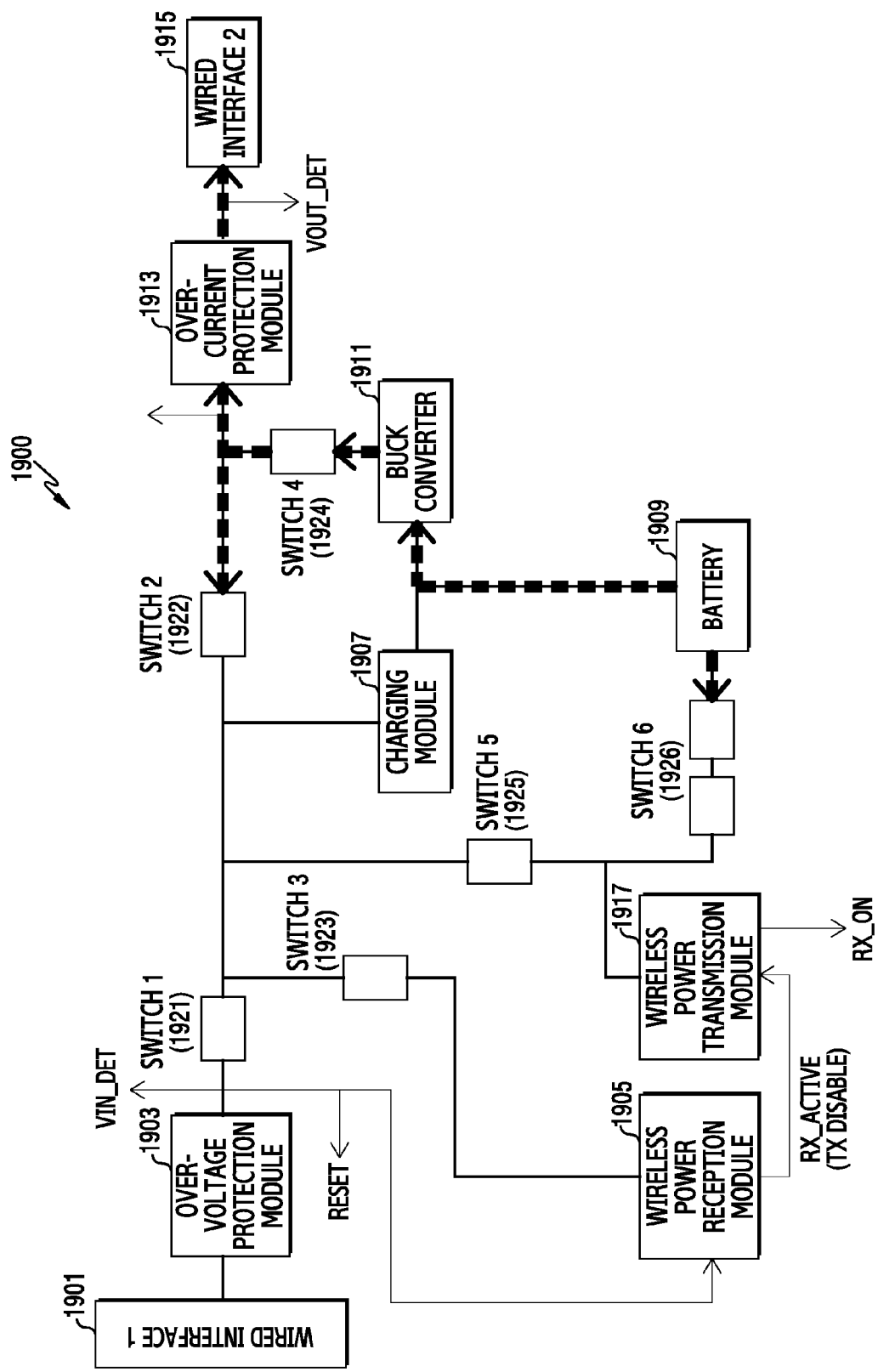
FIG. 19 is a diagram of an example of an electronic device, according to various embodiments of the present disclosure.

FIG. 19 is a diagram of an example of an electronic device, according to various embodiments of the present disclosure. In the discussion with respect to FIG. 19, a current flow for performing the wired power supply by using the battery power in operation 1705 of FIG. 17 will be described.

Referring to FIG. 19, the electronic device 1900 (e.g., the electronic device 500) may control switches 1921 to 1926 in order to perform wired power supply by using the power of a battery 1909 thereof (e.g., the battery 509).

According to an embodiment, the switch 1 (1921) (e.g., the switch 1 (521)) may be deactivated in order to prevent the power of the battery 1909 from flowing into a wired interface 1 (1901) (e.g., the wired interface 1 (501)).

According to an embodiment, the switch 2 (1922) (e.g., the switch 2 (522)) may be deactivated in order to prevent the power of the battery 1909, which is supplied to a wired interface 2 (1915) (e.g., the wired interface 2 (515)), from flowing into a battery charging path by the wired interface 1 (1901).

According to an embodiment, the switch 3 (1923) (e.g., the switch 3 (523)) may be deactivated in order to prevent the power of the battery 1909 from flowing into a battery charging path by a wireless power reception module 1905 (e.g., the wireless power reception module 505).

According to an embodiment, the switch 4 (1924) (e.g., the switch 4 (524)) may be activated in order to supply the power of the battery 1909 to the wired interface 2 (1915).

According to an embodiment, the switch 5 (1925) (e.g., the switch 5 (525)) may be deactivated in order to prevent the power of the battery 1909 from flowing into a battery power supply path for a wireless power transmission module 1917 (e.g., the wireless power transmission module 517).

According to an embodiment, the switch 6 (1926) (e.g., the switch 6 (526)) may be deactivated in order to prevent the power of the battery 1909 from being supplied to the wireless power transmission module 1917.

Figure 20:
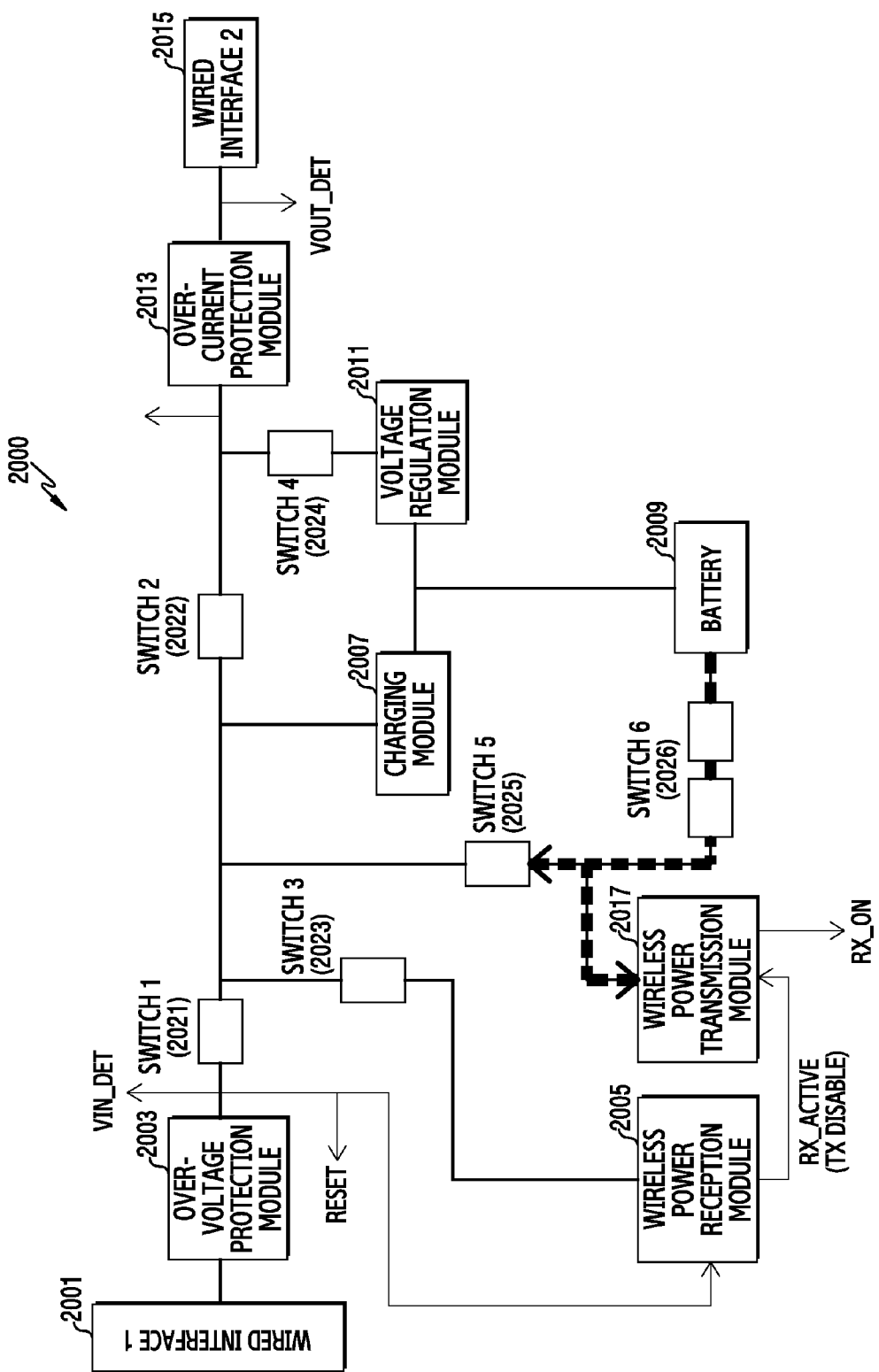
FIG. 20 is a diagram of an example of an electronic device, according to various embodiments of the present disclosure.

FIG. 20 is a diagram of an example of an electronic device, according to various embodiments of the present disclosure. In the discussion with respect to FIG. 20, a current flow for performing the wireless power supply by using the battery power in operation 1713 of FIG. 17 will be described.

Referring to FIG. 20, the electronic device 2000 (e.g., the electronic device 500) may control switches 2021 to 2026 in order to perform wireless power supply by using the power of a battery 2009 thereof (e.g., the battery 509).

According to an embodiment, the switch 1 (2021) (e.g., the switch 1 (521)) may be deactivated in order to prevent the power of the battery 2009 from flowing into a wired interface 1 (2001) (e.g., the wired interface 1 (501)).

According to an embodiment, the switch 2 (2022) (e.g., the switch 2 (522) may be deactivated in order to prevent the power of the battery 2009 from flowing into a battery discharging path by the wired interface 1 (2001).

According to an embodiment, the switch 3 (2023) (e.g., the switch 3 (523)) may be deactivated in order to prevent the power of the battery 2009 from flowing into a battery charging path by a wireless power reception module 2005 (e.g., the wireless power reception module 505).

According to an embodiment, the switch 4 (2024) (e.g., the switch 4 (524)) may be deactivated in order to prevent the power of the battery 2009 from being supplied to a wired interface 2 (2015).

According to an embodiment, the switch 5 (2025) (e.g., the switch 5 (525)) may be deactivated in order to prevent the power of the battery 2009, which is supplied to a wireless power transmission module 2017 (e.g., the wireless power transmission module 517), from flowing into a wired power supply path for the wireless power transmission module 2017.

According to an embodiment, the switch 6 (2026) (e.g., the switch 6 (526)) may be activated in order to supply the power of the battery 2009 to the wireless power transmission module 2017.

Figure 21:
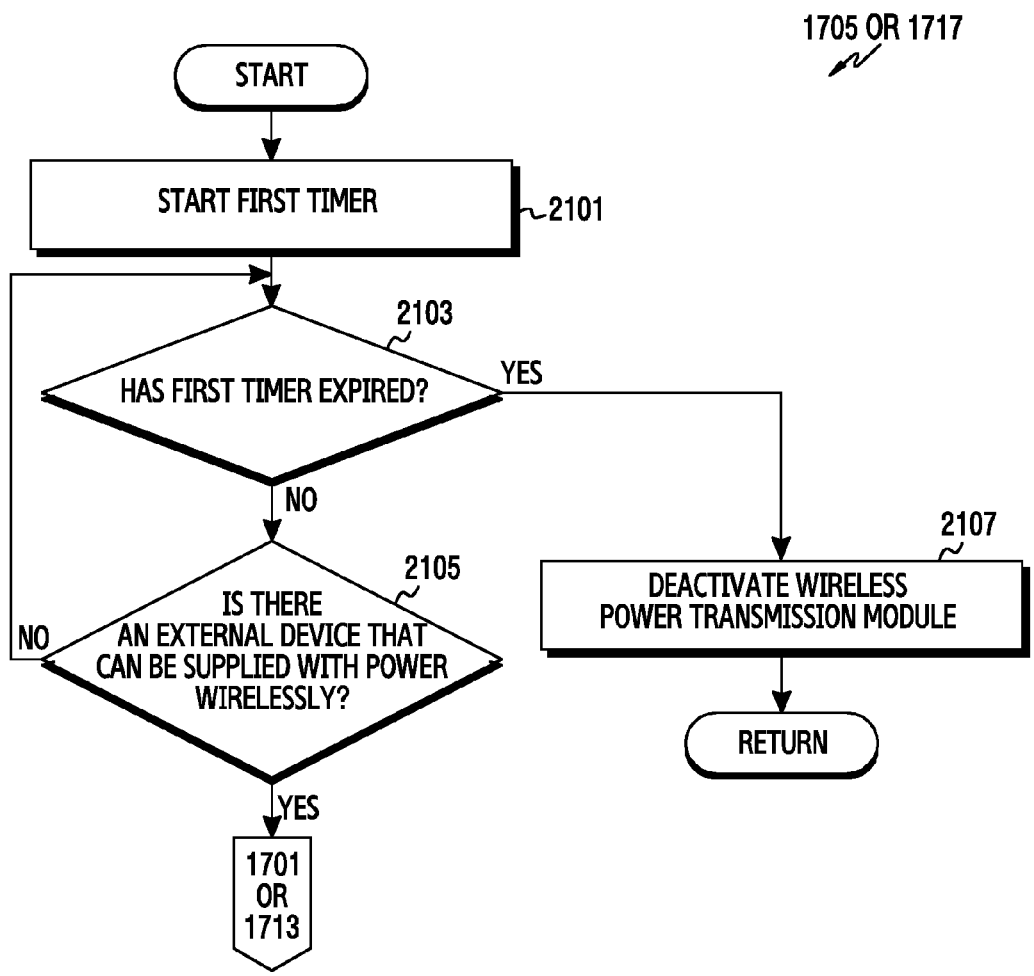
FIG. 21 is a flowchart of an example of a process, according to various embodiments of the present disclosure.

FIG. 21 is a flowchart of an example of a process, according to various embodiments of the present disclosure. Hereinafter, the operation of deactivating the wireless power supply in operation 1705 or 1717 of FIG. 17 will be described.

Referring to FIG. 21, in operation 2101, when an external device that can be supplied with power wirelessly does not exist, the electronic device (e.g., the electronic device 101, 201, 400, or 500) may start a first timer that is operated for a first reference time. For example, the electronic device 400 or 500 may reset the first timer when a wireless connection with an external device that is being supplied with power wirelessly is released. For example, the electronic device 400 or 500 may reset the first timer when receiving a charging completion signal from the external device that is supplied with power wirelessly.

In operation 2103, the electronic device may detect whether the first timer has expired. For example, the electronic device 400 or 500 may detect whether the first reference time elapses from the time point when it is detected that there is no external device that can be supplied with power wirelessly.

In operation 2105, before the first time expires, the electronic device may again detect whether there is an external device that can be supplied with power wirelessly. For example, the electronic device 400 or 500 may detect whether an external device to be supplied with power in a wireless manner is connected thereto again for the first reference time.

When an external device exists that can be supplied with power wirelessly, the electronic device may restart the wireless power supply in operation 1701 or 1723. For example, when an external device exists that can be supplied with power wirelessly, the electronic device 400 or 500 may control the switch 6 (526) to supply the power of the battery to the wireless power transmission module 431 or 517. In this case, the electronic device may complete the operation of the first timer.

When there is no external device that can be supplied with power wirelessly, the electronic device may again detect whether the first timer has expired.

In operation 2107, the electronic device may deactivate a wireless power transmission module when the first timer expires. For example, the electronic device 400 or 500 may control to deactivate the wireless power transmission module 431 or 517 after the first timer expires. Further, the electronic device 400 or 500 may control the switch 6 (526) to prevent the power of the battery from being supplied to the wireless power transmission module 431 or 517.

Figure 22:
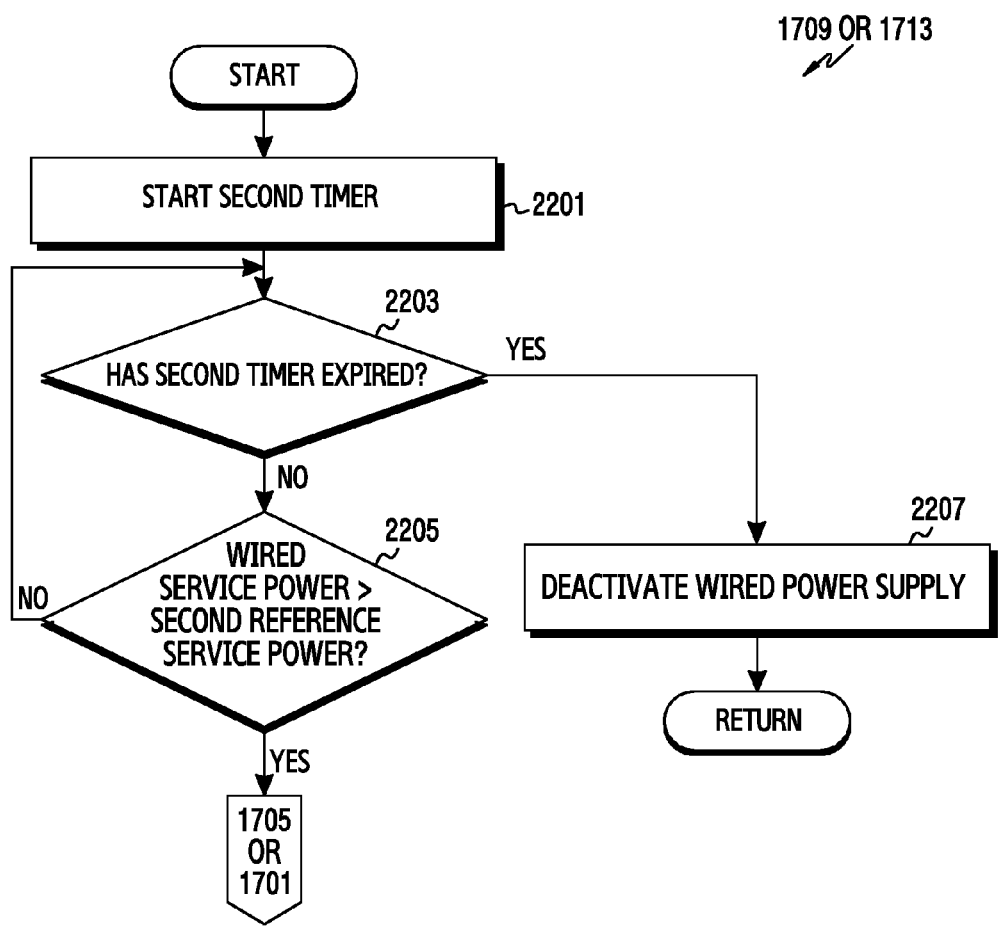
FIG. 22 is a flowchart of an example of a process, according to various embodiments of the present disclosure.

FIG. 22 is a flowchart of an example of a process, according to various embodiments of the present disclosure. In the discussion with respect to FIG. 22, the operation of deactivating the wired power supply in operation 1709 or 1713 of FIG. 17 will be described.

Referring to FIG. 22, in operation 2201, when the wired service power is lower than or equal to the second reference service power, the electronic device (e.g., the electronic device 101, 201, 400, or 500) may start a second timer that is operated for a second reference time. For example, the electronic device 400 or 500 may reset the second timer when a wired connection with an external device that is being supplied with power over the wired connection is released. For example, the electronic device 400 or 500 may reset the second timer when the external device that is supplied with power over the wired connection is completely charged.

In operation 2203, the electronic device may detect whether the second timer has expired. For example, the electronic device 400 or 500 may detect whether the second reference time elapses from the time point when it is identified that the wired service power is lower than or equal to the second reference service power.

In operation 2205, if the second timer has not yet expired, the electronic device may detect whether the wired service power exceeds the second reference service power. For example, the electronic device 400 or 500 may detect whether an external device to be supplied with power in a wired manner is connected thereto again for the second reference time.

The electronic device may restart the wired power supply in operation 1705 or 1701 when the wired service power exceeds the second reference service power. For example, the electronic device 400 or 500 may control the switch 4 (524) to supply the power of the battery to the wired interface 2 (413 or 515) when the wired service power exceeds the second reference service power. In this case, the electronic device 400 or 500 may complete the operation of the second timer.

In cases where the wired service power is lower than or equal to the second reference service power, the electronic device may again detect whether the second timer has expired, in operation 2203.

In operation 2207, the electronic device may deactivate the wired charging. For example, the electronic device 400 or 500 may control the switch 4 (524) to prevent the power of the battery from being supplied to the wired interface 2 (413 or 515) after the second timer has expired.

Figure 23:
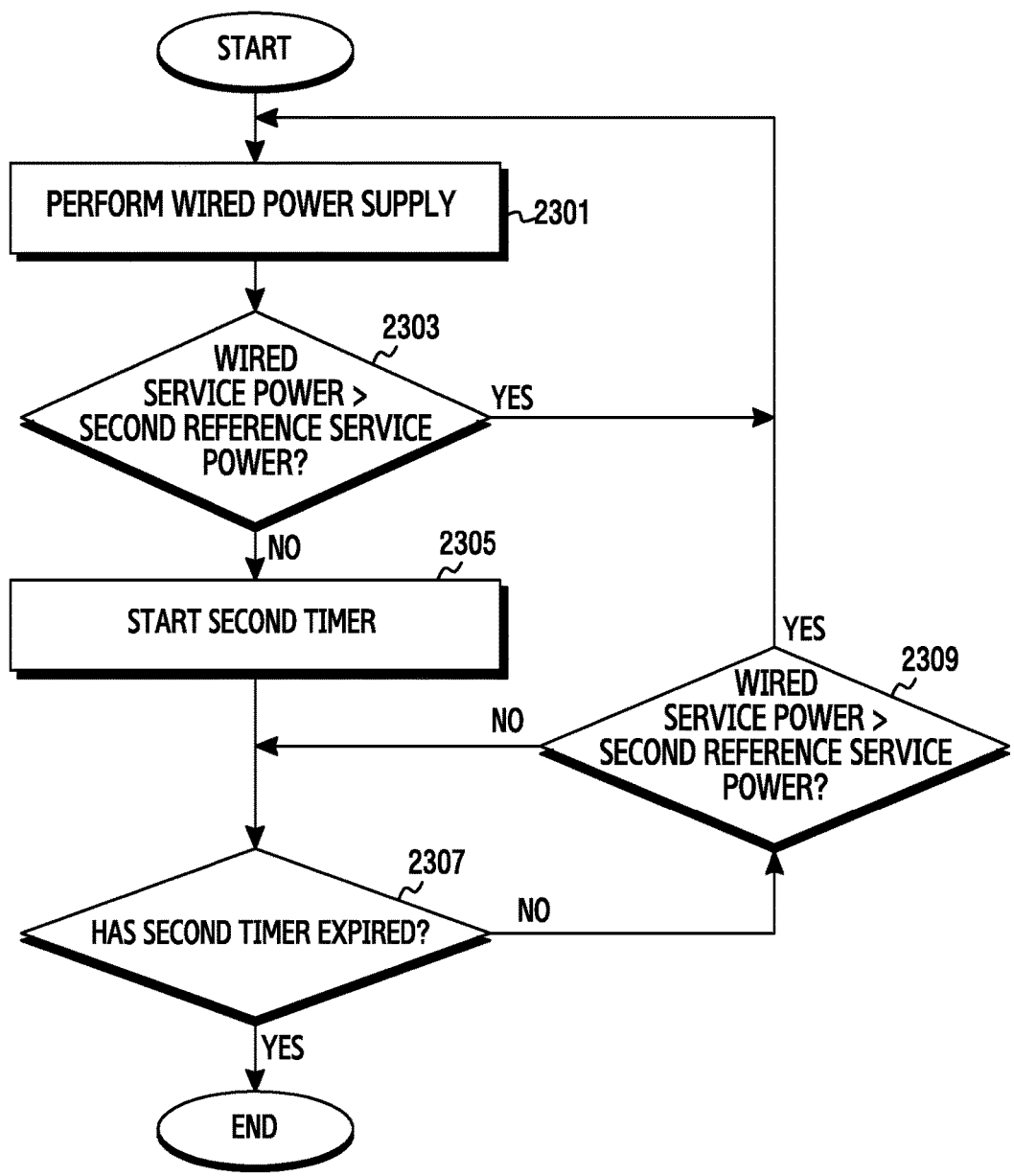
FIG. 23 is a flowchart of an example of a process, according to various embodiments of the present disclosure.

FIG. 23 is a flowchart of an example of a process for supplying power in a wired manner by using the power of a battery in an electronic device, according to various embodiments of the present disclosure.

Referring to FIG. 23, in operation 2301, the electronic device (e.g., the electronic device 101, 201, 400 or 500) may perform wired power supply by using the power of the battery thereof. For example, the electronic device 400 or 500 may activate the switch 4 (524) to supply the battery power to at least one external device that is connected thereto through the wired interface 2 (413 or 515).

In operation 2303, the electronic device may detect whether the wired service power exceeds the second reference service power. For example, the electronic device 400 or 500 may compare the wired service power and the second reference service power to determine whether to maintain the wired power supply.

The electronic device may maintain the wired power supply in operation 2301 when the wired service power exceeds the second reference service power.

In operation 2305, when the wired service power is lower than or equal to the second reference service power, the electronic device may start a second timer that is operated for a second reference time. For example, when the wired service power is lower than or equal to the second reference service power, the electronic device 400 or 500 may determine to stop the wired power supply and may reset the second timer.

In operation 2307, the electronic device may detect whether the second timer has expired.

In operation 2309, when the second timer has not yet expired, the electronic device may detect whether the wired service power exceeds the second reference service power. For example, the electronic device 400 or 500 may detect whether an external device to be supplied with power over a wired channel is connected thereto again for the second reference time.

The electronic device may maintain the wired power supply in operation 2301 when the wired service power exceeds the second reference service power.

When the wired service power is lower than or equal to the second reference service power, the electronic device may again detect whether the second timer has expired, in operation 2307.

The electronic device may deactivate the wired charging after the second timer expires. For example, the electronic device 400 or 500 may control the switch 4 (524) to prevent the power of the battery from being supplied to the wired interface 2 (413 or 515) when the second timer expires.

Figure 24:
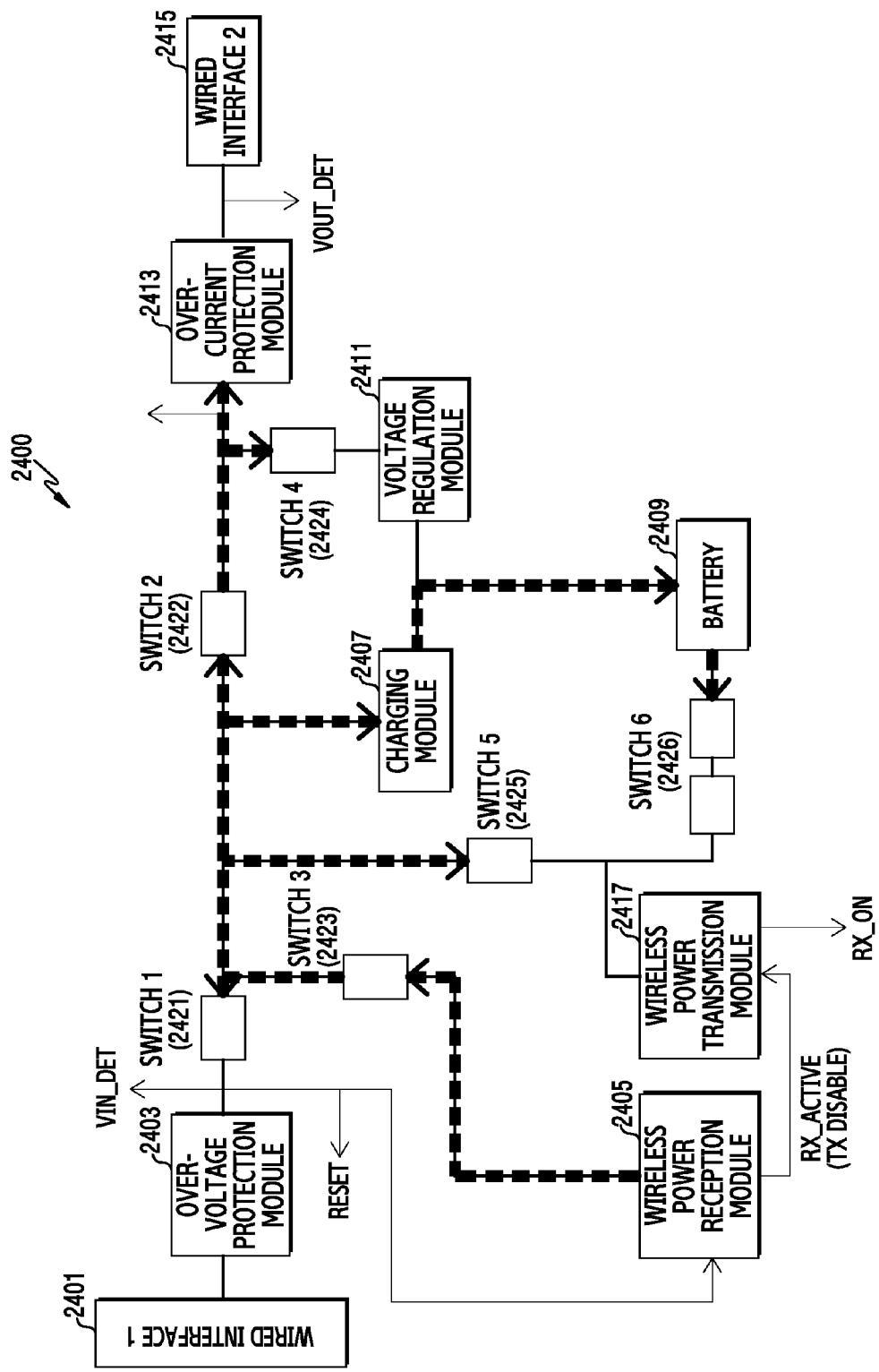
FIG. 24 is a diagram of an example of an electronic device, according to various embodiments of the present disclosure.

FIG. 24 is a diagram of an example of an electronic device, according to various embodiments of the present disclosure. In the discussion with respect to FIG. 24, a current flow for performing battery charging and wired power supply by using external power received through a wireless connection will be described.

Referring to FIG. 24, the electronic device 2400 (e.g., the electronic device 500) may control switches 2421 to 2426 to perform battery charging and wired power supply by using external power that is received through a wireless power reception module 2405 (e.g., the wireless power reception module 505).

According to an embodiment, the switch 1 (2412) (e.g., the switch 1 (521)) may be deactivated in order to prevent the external power, which is received through the wireless power reception module 2405, from flowing into a wired interface 1 (2401) (e.g., the wired interface 1 (501)).

According to an embodiment, the switch 2 (2422) (e.g., the switch 2 (522)) may be activated in order to supply the external power, which is received through the wireless power reception module 2405, to a wired interface 2 (2415) (e.g., the wired interface 2 (515)).

According to an embodiment, the switch 3 (2423) (e.g., the switch 3 (523)) may be activated in order to supply the power, which is received through the wireless power reception module 2405, to a battery charging path.

According to an embodiment, the switch 4 (2424) (e.g., the switch 4 (524)) may be deactivated in order to prevent the external power, which is received through the wired interface 2405 (1501), from flowing into a battery discharging path.

According to an embodiment, the switch 5 (2425) (e.g., the switch 5 (525)) may be deactivated in order to prevent the external power, which is received through the wireless power reception module 2405, from flowing into a wireless power transmission module 2417 (e.g., the wireless power transmission module 517).

According to an embodiment, the switch 6 (2426) (e.g., the switch 6 (526)) may be deactivated in order to prevent the power of a battery 2409 from being supplied to the wireless power transmission module 2417.

Figure 25:
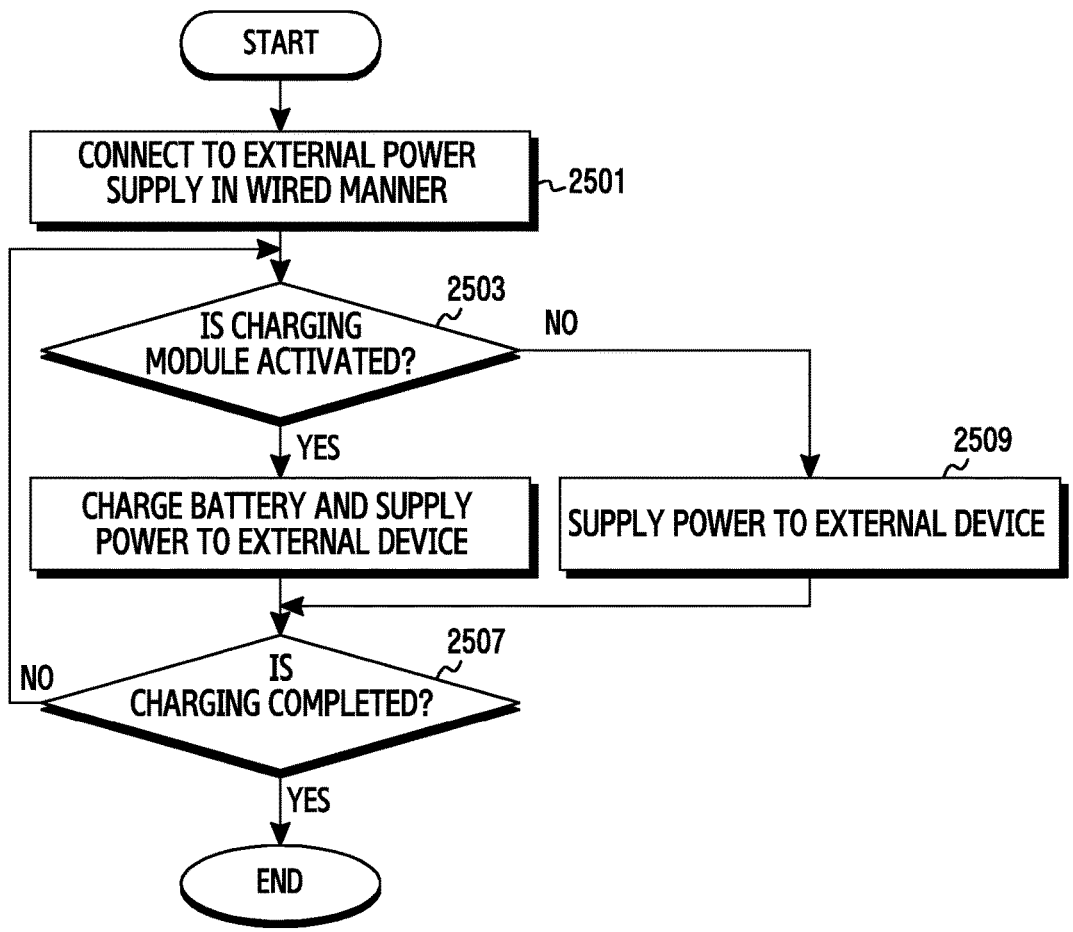
FIG. 25 is a flowchart of an example of a process, according to various embodiments of the present disclosure.

FIG. 25 is a flowchart of an example of a process for charging and discharging a battery by using wired power, according to various embodiments of the present disclosure. In the following description, an electronic device is assumed to be connected to an external power supply device through a DCP charging method.

Referring to FIG. 25, in operation 2501, the electronic device (e.g., the electronic device 101, 201, 400 or 500) may be connected to the external power supply device through a wired interface (e.g., the wired interface 1 (501)).

In operation 2503, in response to the connection with the external power supply device, the electronic device may determine whether to activate a charging module (e.g., the charging module 507). For example, the electronic device 500 may activate the charging module 507 in order to charge the battery 509. The charging module 507 may be deactivated when the battery 509 is completely (fully) charged.

In operation 2505, when the charging module is activated, the electronic device may charge the battery thereof and may supply power to an external device by using external power that is received through the wired connection. For example, the electronic device 500 may charge the battery 509 by supplying external power, which is received from the wired interface 1 (501), to the battery 509 through the charging module 507. The electronic device 500 may supply the external power received from the wired interface 1 (501) or the power of the battery 509 to the external device through at least one of the wired interface 2 (515) or the wireless power transmission module 517. For example, when a wired power supply function is activated (turned on), the electronic device 500 may supply the external power, which is received from the wired interface 1 (501), to the external device through the wired interface 2 (515). In cases where a wireless power supply function is activated (turned on), the electronic device 500 may supply the power of the battery 509 to the wireless power transmission module 517.

In operation 2509, when the charging module is deactivated, the electronic device may supply power to the external device by using the external power that is received through the wired connection. For example, when a wired power supply function is activated (turned on), the electronic device 500 may supply the external power, which is received from the wired interface 1 (501), to the external device through the wired interface 2 (515). In cases where a wireless power supply function is activated (turned on), the electronic device 500 may supply the power of the battery 509 to the wireless power transmission module 517. For example, when wired power that exceeds the second reference service power (e.g., 20 mA) is supplied through the wired interface 2 (515), the electronic device 500 may determine that the wired power supply function has been activated. In cases where the external device connects to the wireless power transmission module 517 (e.g., a wireless charging pad), the electronic device 500 may determine that the wireless power supply function has been activated.

In operation 2507, the electronic device may detect whether the battery charging and the power supply to the external device using the external power received through the wired connection have been completed.

In cases where the battery charging or the power supply to the external device using the external power received through the wired connection are not completed, the electronic device may detect whether the charging module (e.g., the charging module 507) has been activated in operation 2503.

Figure 26:
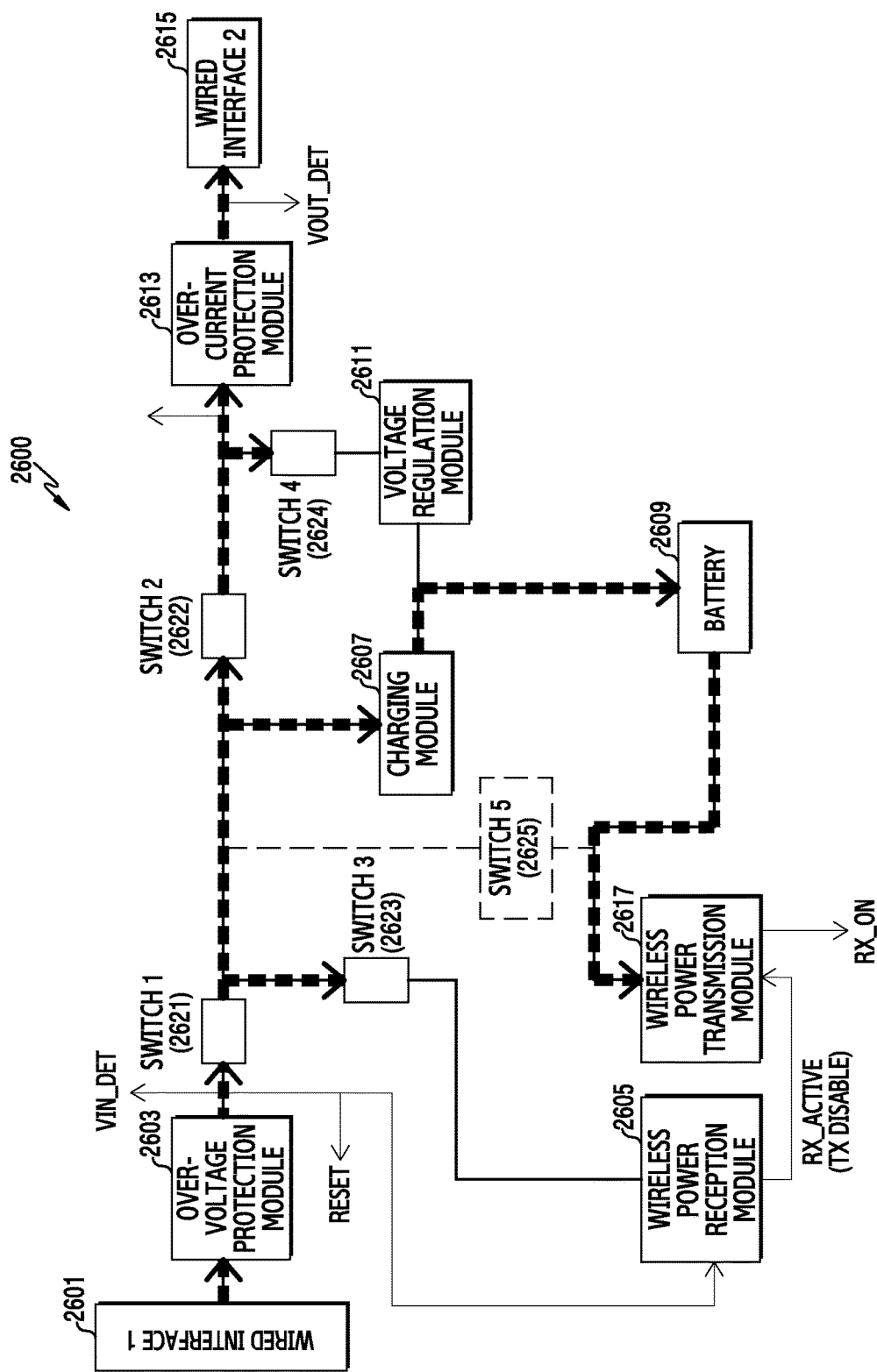
FIG. 26 is a diagram of an example of an electronic device, according to various embodiments of the present disclosure.

FIG. 26 is a diagram of an example of an electronic device, according to various embodiments of the present disclosure. In the discussion with respect to FIG. 26, a current flow for performing the battery charging, the wired power supply, and the wireless power supply by using the external power received through the wired connection in operation 2505 of FIG. 25 will be described.

Referring to FIG. 26, the electronic device 2600 (e.g., the electronic device 500), when being connected to an external power supply device through a wired interface 1 (2601) (e.g., the wired interface 1 (501)), may control switches 2621 to 2624 to perform the battery charging and the wired power supply.

According to an embodiment, the switch 1 (2621) (e.g., the switch 1 (521)) may be activated in order to supply external power, which is received through the wired interface 1 (2601), to a battery charging path.

According to an embodiment, the switch 2 (2622) (e.g., the switch 2 (522)) may be activated in order to supply the external power, which is received through the wired interface 1 (2601), to a wired interface 2 (2615) (e.g., the wired interface 2 (515)).

According to an embodiment, the switch 3 (2623) (e.g., the switch 3 (523)) may be deactivated (turned off) in order to prevent the external power, which is received through the wired interface 1 (2601), from flowing into a battery charging path by a wireless power reception module 2605 (e.g., the wireless power reception module 505).

According to an embodiment, the switch 4 (2624) (e.g., the switch 4 (524)) may be deactivated in order to prevent the external power, which is received through the wired interface 1 (2601), from flowing into a battery discharging path.

According to various embodiments of the present disclosure, the electronic device 2600 may further include a switch 5 (2625) (e.g., the switch 5 (525)) that connects a battery 2609 (e.g., the battery 509) and a wireless power transmission module 2617 (e.g., the wireless power transmission module 517). For example, when wireless power supply is performed, the switch 5 (2625) may be activated in order to supply the power of the battery 2609 to the wireless power transmission module 2617.

Figure 27:
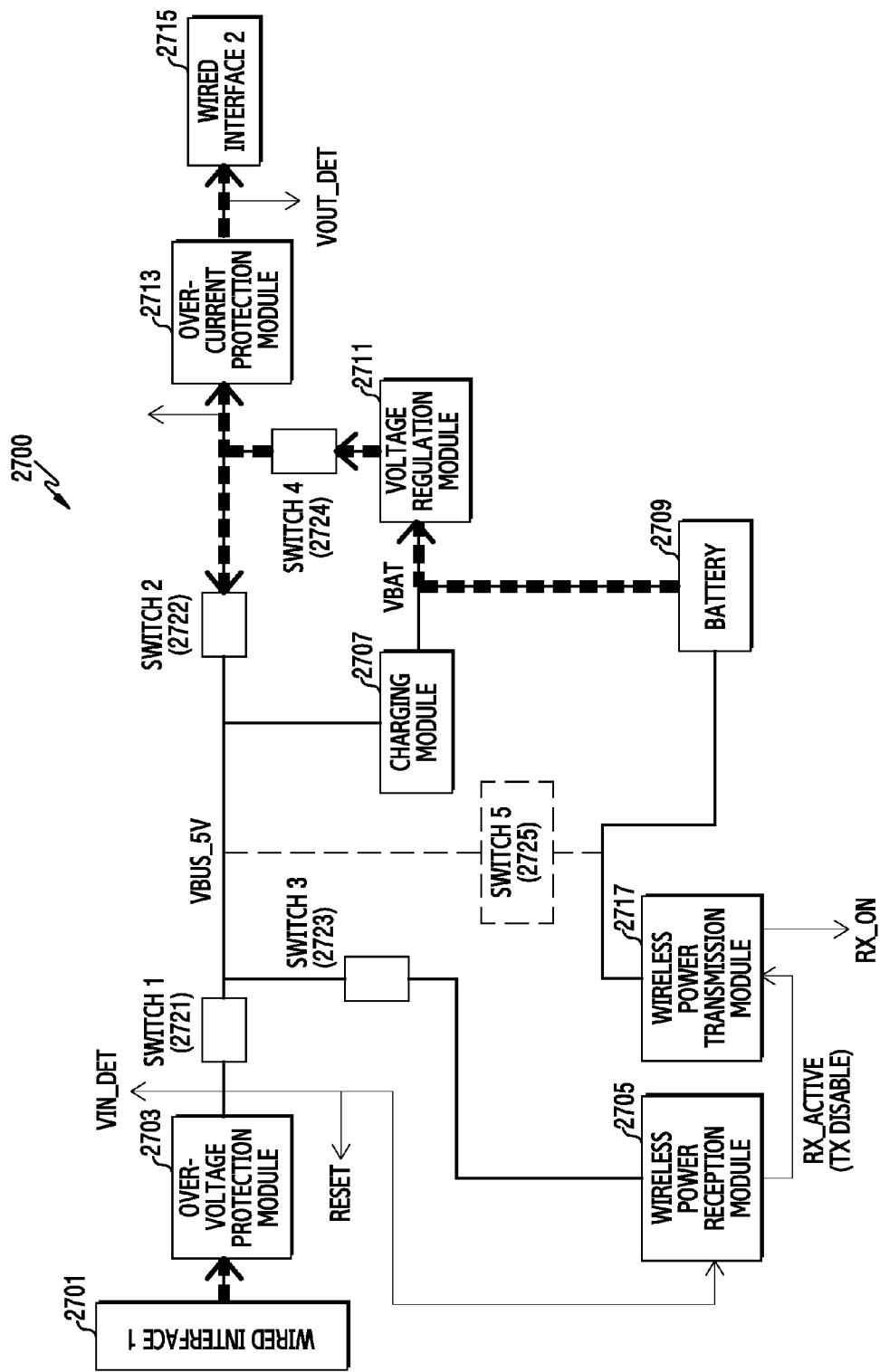
FIG. 27 is a diagram of an example of an electronic device, according to various embodiments of the present disclosure.

FIG. 27 is a diagram of an example of an electronic device, according to various embodiments of the present disclosure. More particularly, FIG. 27 illustrates a current flow for supplying power in a wired manner by using the power of a battery in an electronic device.

Referring to FIG. 27, the electronic device 2700 (e.g., the electronic device 500) may control switches 2721 to 2724 in order to supply the power of a battery 2709 (e.g., the battery 509) to at least one external device that is connected thereto via a wired connection. For example, the electronic device 2700 may control switches 2721 to 2724 in order to activate only the path between the battery 2709 and a wired interface 2 (2715) (e.g., the wired interface 2 (515)). For example, when a wired power supply function is activated (turned on), the electronic device 2700 may control the switches 2721 to 2724 to supply the power of the battery 2709 to the wired interface 2 (2715).

According to an embodiment, the switch 1 (2721) (e.g., the switch 1 (521)) may be deactivated in order to prevent the power of the battery 2709 from flowing into a wired interface 1 (2701) (e.g., the wired interface 1 (501)).

According to an embodiment, the switch 2 (2722) (e.g., the switch 2 (522)) may be deactivated in order to prevent the power of the battery 2709, which is supplied to the wired interface 2 (2715), from flowing into a battery charging path by the wired interface 1 (2701).

According to an embodiment, the switch 3 (2723) (e.g., the switch 3 (523)) may be deactivated in order to prevent the power of the battery 2709 from flowing into a battery charging path by a wireless power reception module 2705 (e.g., the wireless power reception module 505).

According to an embodiment, the switch 4 (2724) (e.g., the switch 4 (524)) may be activated in order to supply the power of the battery 2709 to the wired interface 2 (2715).

According to various embodiments of the present disclosure, the electronic device 2700 may further include a switch 5 (2715) (e.g., the switch 5 (525)) that connects the battery 2709 (e.g., the battery 509) and a wireless power transmission module 2717 (e.g., the wireless power transmission module 517). For example, the switch 5 (2715) may be deactivated during wired power supply in order to prevent the power of the battery 2709 from flowing into the wireless power transmission module 2717.

Figure 28:
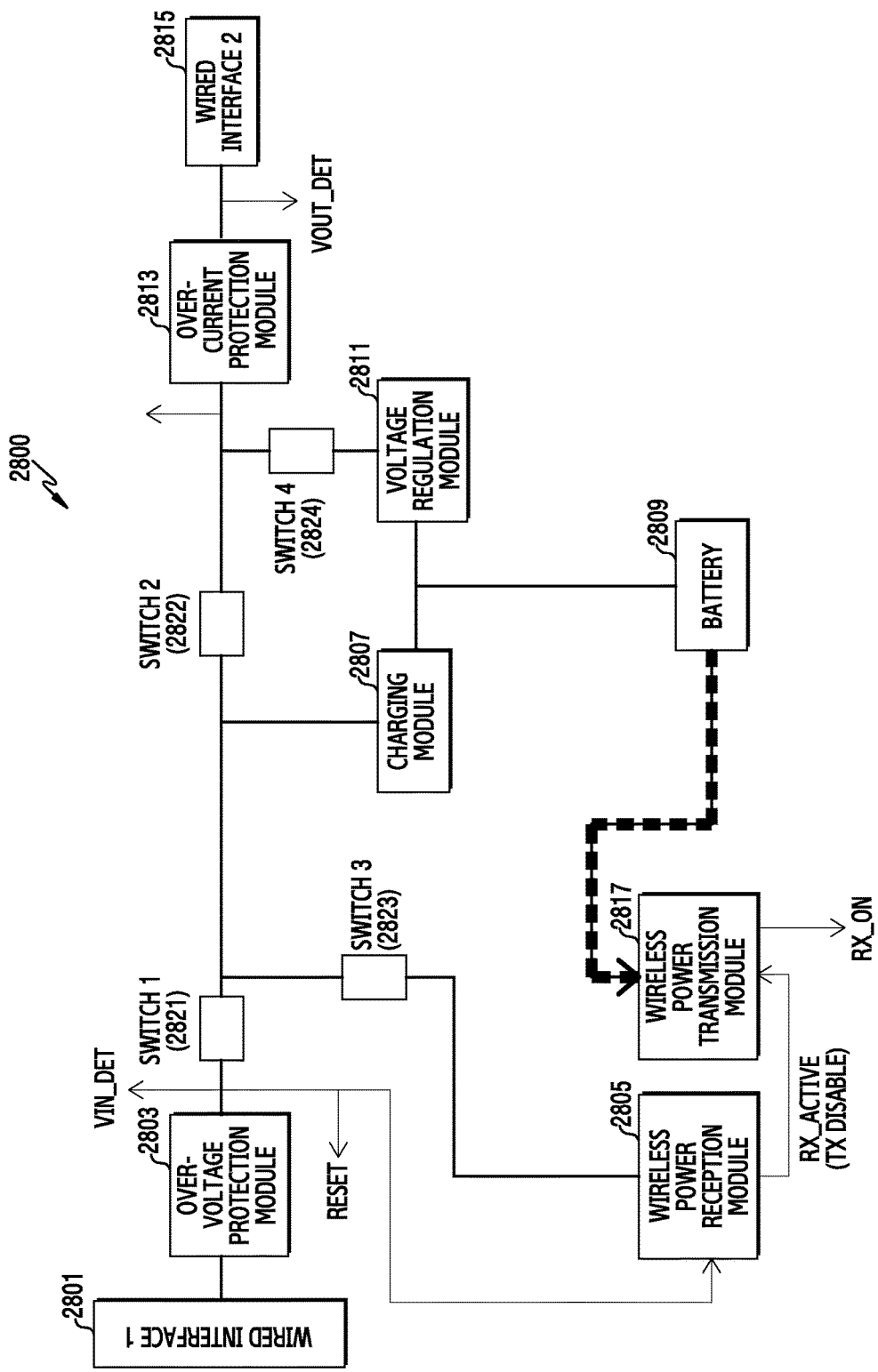
FIG. 28 is a diagram of an example of an electronic device, according to various embodiments of the present disclosure.

FIG. 28 is a diagram of an example of an electronic device, according to various embodiments of the present disclosure. In the discussion with respect to FIG. 28, a current flow for supplying power wirelessly by using the power of a battery in an electronic device will be described.

Referring to FIG. 28, the electronic device 2800 (e.g., the electronic device 500) may control switches 2821 to 2824 in order to supply the power of a battery 2809 (e.g., the battery 509) to at least one external device that is wirelessly connected thereto. For example, the electronic device 2800 may control switches 2821 to 2824 in order to activate only the path between the battery 2809 and a wireless power transmission module 2817 (e.g., the wireless power transmission module 517).

According to an embodiment, the switch 1 (2821) (e.g., the switch 1 (521)) may be deactivated in order to prevent the power of the battery 2809 from flowing into a wired interface 1 (2809) (e.g., the wired interface 1 (501)).

According to an embodiment, the switch 2 (2822) (e.g., the switch 2 (522)) may be deactivated in order to prevent the power of the battery 2809 from flowing into a battery charging path by the wired interface 1 (2801).

According to an embodiment, the switch 3 (2823) (e.g., the switch 3 (523)) may be deactivated in order to prevent the power of the battery 2809 from flowing into a battery charging path by a wireless power reception module 2805 (e.g., the wireless power reception module 505).

According to an embodiment, the switch 4 (2824) (e.g., the switch 4 (524)) may be deactivated in order to prevent the power of the battery 2809 from being supplied to a wired interface 2 (2815).

Figure 29:
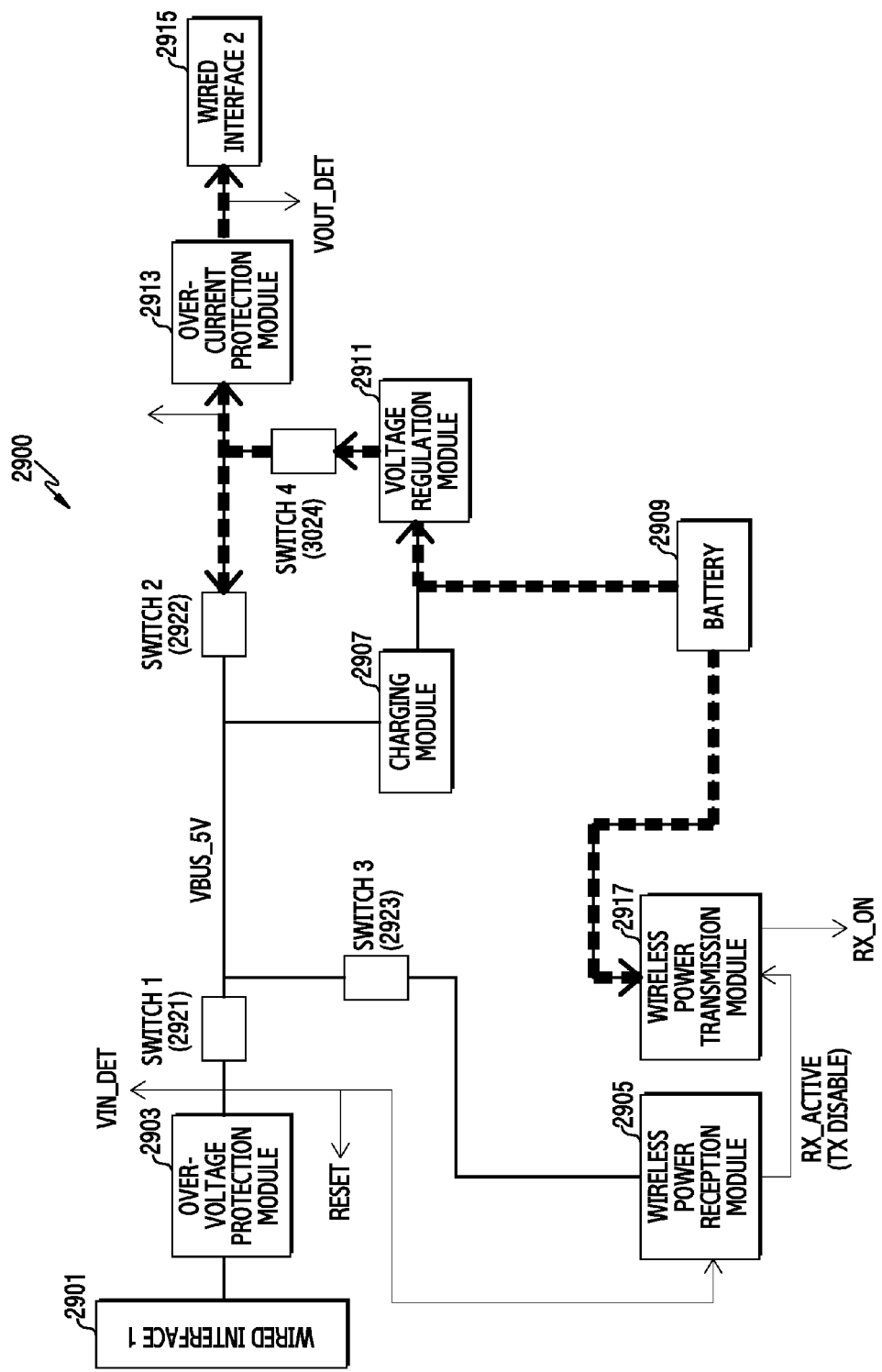
FIG. 29 is a diagram of an example of an electronic device, according to various embodiments of the present disclosure.

FIG. 29 is a diagram of an example of an electronic device, according to various embodiments of the present disclosure. More particularly, FIG. 29 illustrates a current flow for supplying power in a wireless/wired manner by using the power of a battery in an electronic device.

Referring to FIG. 29, the electronic device 2900 (e.g., the electronic device 500) may control switches 2921 to 2924 in order to supply the power of a battery 2909 (e.g., the battery 509) to at least one external device that is connected thereto in a wired/wireless manner. For example, the electronic device 2900 may control the switches 2921 to 2924 to activate a path between the battery 2909 and a wired interface 2 (2915) (e.g., the wired interface 2 (515)) and a path between the battery 2909 and a wireless power transmission module 2917 (e.g., the wireless power transmission module 517).

According to an embodiment, the switch 1 (2921) (e.g., the switch 1 (521)) may be deactivated in order to prevent the power of the battery 2909 from flowing into a wired interface 1 (2901) (e.g., the wired interface 1 (501)).

According to an embodiment, the switch 2 (2922) (e.g., the switch 2 (522)) may be deactivated in order to prevent the power of the battery 2909, which is supplied to the wired interface 2 (2915) (e.g., the wired interface 2 (515)), from flowing into a battery charging path by the wired interface 1 (2901).

According to an embodiment, the switch 3 (2923) (e.g., the switch 3 (523)) may be deactivated in order to prevent the power of the battery 2909 from flowing into a battery charging path by a wireless power reception module 2905 (e.g., the wireless power reception module 505).

According to an embodiment, the switch 4 (2924) (e.g., the switch 4 (524)) may be activated in order to supply the power of the battery 2909 to the wired interface 2 (2915).

Figure 30:
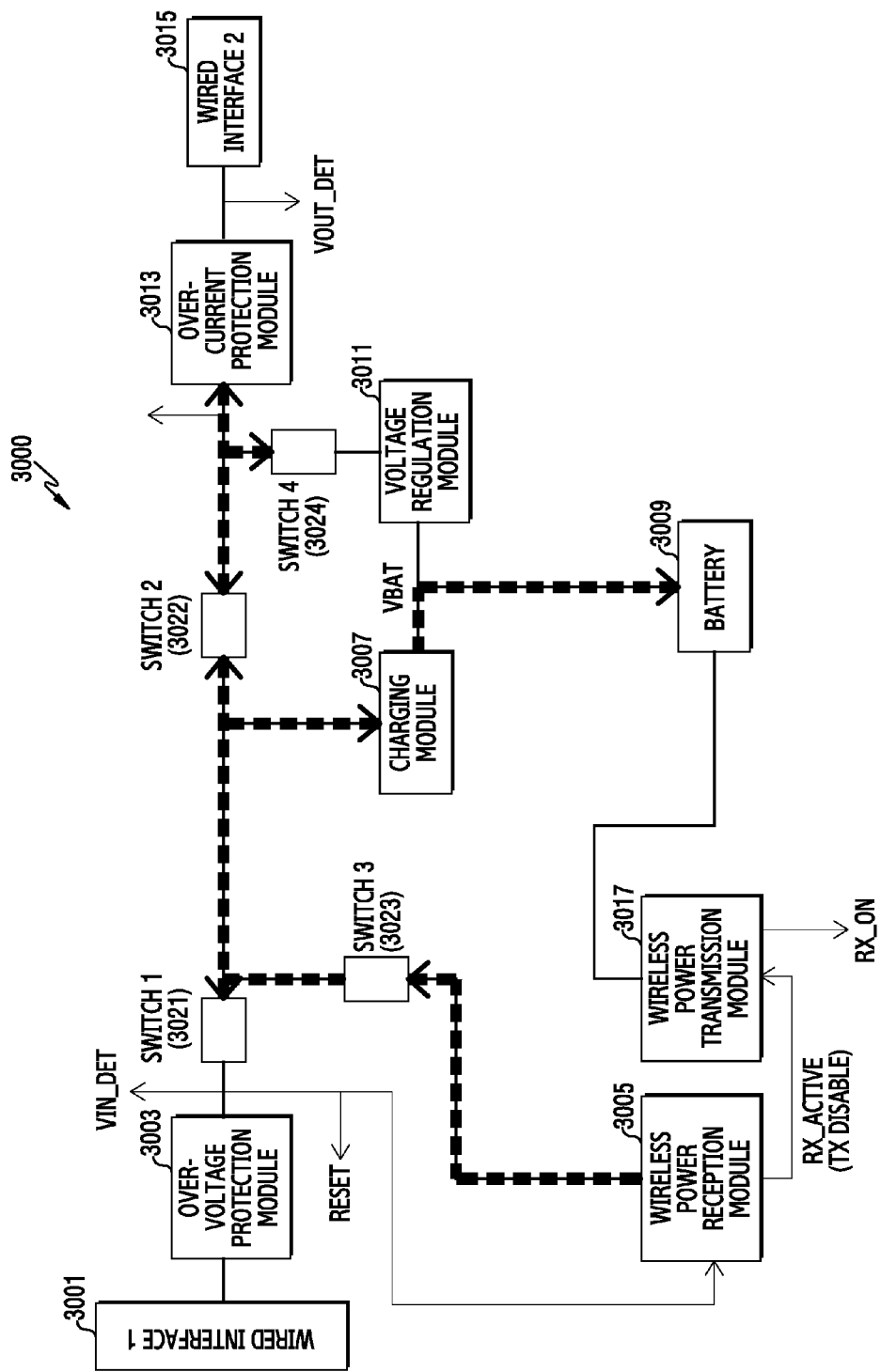
FIG. 30 is a diagram of an example of an electronic device, according to various embodiments of the present disclosure.

FIG. 30 is a diagram of an example of an electronic device, according to various embodiments of the present disclosure. In the discussion with respect to FIG. 30, a current flow for performing battery charging and wireless power supply by using external power received through a wireless connection will be described.

Referring to FIG. 30, the electronic device 3000 (e.g., the electronic device 500) may control switches 3021 to 3024 to perform battery charging and wired power supply by using external power that is received through a wireless power reception module 3005 (e.g., the wireless power reception module 505). For example, the electronic device 3000 may control the switches 3021 to 3024 to prevent the external power, which is received through the wireless power reception module 3005, from flowing into a wired interface 1 (3001) (e.g., the wired interface 1 (501)) and a wireless power transmission module 3017 (e.g., the wireless power transmission module 517).

According to an embodiment, the switch 1 (3021) (e.g., the switch 1 (521)) may be deactivated in order to prevent the external power, which is received through the wireless power reception module 3005, from flowing into the wired interface 1 (3001).

According to an embodiment, the switch 2 (3022) (e.g., the switch 2 (522)) may be activated in order to supply the external power, which is received through the wireless power reception module 3005, to a wired interface 2 (3015) (e.g., the wired interface 2 (515)).

According to an embodiment, the switch 3 (3023) (e.g., the switch 3 (523)) may be activated in order to supply the external power, which is received through the wireless power reception module 3005, to a battery charging path.

According to an embodiment, the switch 4 (3024) (e.g., the switch 4 (524)) may be deactivated in order to prevent the external power, which is received through the wireless power reception module 3005, from flowing into a battery discharging path.

According to various embodiments of the present disclosure, the electronic device 3000 may further include a switch 5 that connects the battery 3009 (e.g., the battery 509) and the wireless power transmission module 3017. For example, the switch 5 may be deactivated during wired power supply in order to prevent the power of the battery 3009 from flowing into the wireless power transmission module 3017.

According to various embodiments of the present disclosure, a method of operating an electronic device may include: receiving power from a first external device in a wireless manner; charging at least some of the plurality of cells in the battery of the electronic device by using the power; changing a first voltage, which is generated by a series connection between at least two of the plurality of cells in the battery, into a second voltage that is lower than the first voltage; and transmitting power based on the second voltage to a second external device in a wireless manner.

According to various embodiments, the transmitting of the power to the second external device may include: receiving a first signal from the second external device; and transmitting the power based on the second voltage to the second external device at least partially based on the first signal.

According to various embodiments, the method may further include displaying at least one of the charging state of the battery and the charging state of a battery of the second external device.

According to various embodiments, the charging of the at least some of the plurality of cells in the battery may include charging at least two of the plurality of cells in the battery, which are connected in parallel, by using the wirelessly received power.

According to various embodiments, the method may further include: receiving power from a third external device in a wired manner; charging at least some of the plurality of cells in the battery by using the wiredly received power; changing a third voltage, which is generated by a series connection between at least two of the plurality of cells in the battery, into a fourth voltage that is lower than the third voltage; and transmitting power based on the fourth voltage to a fourth external device in a wired manner.

According to various embodiments, the method may further include transmitting, to the fourth external device, at least some of the wiredly received power or the wirelessly received power.

According to various embodiments, the method may further include transmitting at least some of the wiredly received power to the second external device.

According to various embodiments, the method may further include shutting off the power transmitted to the second or fourth external device to prevent the power from flowing into the first external device and the third external device.

According to various embodiments of the present disclosure, a method of operating an electronic device may include: receiving power from a first external device in a wireless manner; charging at least some of the plurality of cells in the battery of the electronic device by using the power; selectively connecting at least two of the plurality of cells in the battery in series; and transmitting power based on a first voltage, which is generated by the cells that are selectively connected in series, to a second external device in a wireless manner.

According to various embodiments, the transmitting of the power to the second external device may include: receiving a first signal from the second external device; and transmitting the power based on the first voltage to the second external device at least partially based on the first signal.

According to various embodiments, the method may further include displaying at least one of the charging state of the battery and the charging state of a battery of the second external device.

According to various embodiments, the method may further include: receiving power from a third external device in a wired manner; charging at least some of the plurality of cells in the battery by using the wiredly received power; selectively connecting at least two of the plurality of cells in the battery in series; and transmitting power based on a second voltage, which is generated by the cells that are selectively connected in series, to a fourth external device in a wired manner.

According to various embodiments, the method may further include transmitting, to the fourth external device, at least some of the wiredly received power or the wirelessly received power.

According to various embodiments, the method may further include transmitting at least some of the wiredly received power to the second external device.

According to various embodiments, the method may further include shutting off the power transmitted to the second or fourth external device to prevent the power from flowing into the first external device and the third external device.

According to various embodiments of the present disclosure, a method of operating an electronic device may include: receiving first power from a first external device in a wired or wireless manner; separating the first power into second power and third power; charging a battery of the electronic device by using the second power; and transmitting the third power to a second external device, wherein the separating may include determining a first amount of power, which is to be separated as the second power, among the first power and a second amount of power, which is to be separated as the third power, based on the result obtained by comparing a first charging variable for charging the battery and a second charging variable for charging a battery of the second external device.

According to various embodiments, the first charging variable may include at least one of the residual quantity of the first battery, a charging completion time of the first battery, and the capacity (the whole capacity) of the first battery, and the second charging variable may include at least one of the residual quantity of the second battery, a charging completion time of the second battery, information on the connection with the second external device, information on the operating state of the second external device, and the capacity (the whole capacity) of the second battery.

According to various embodiments of the present disclosure, a method of operating an electronic device may include: receiving power from a first external device in a wired or wireless manner; charging at least some of a plurality of cells in a battery of the electronic device by using the power; generating a voltage by a series connection between at least two of the plurality of cells in the battery; and transmitting power based on the voltage, which is generated by the cells connected in series, to a second external device in a wired and/or wireless manner.

According to various embodiments, the method may further include transmitting at least some of the wiredly or wirelessly received power to the second external device in a wired and/or wireless manner.

The electronic devices and the operating methods thereof, according to the various embodiments of the present disclosure, can charge a battery and supply power to an external device through wireless charging, and can receive external power or supply the power of a battery to an external device without a separate wired connection, thereby enhancing portability of the electronic devices.

The electronic devices and the operating methods, according to the various embodiments of the present disclosure, can support charging and discharging in a wired/wireless manner, thereby charging a battery thereof and supplying power to an external device at the same time.

The electronic devices and the operating methods thereof, according to the various embodiments of the present disclosure, can connect a plurality of battery cells in series when supplying power to another electronic device, thereby restricting the use of an additional circuit (module) (e.g., a booster) for increasing a voltage.

The electronic devices and the operating methods thereof, according to the various embodiments of the present disclosure, can adjust amounts of charge of multiple external devices when supplying power to the external devices, thereby efficiently using a limited battery resource.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When an instruction is implemented by one or more processors (for example, the processor 120), one or more processors may execute a function corresponding to the instruction. The computer-readable storage medium may be, for example, the memory 130.

Any of the modules or programming modules according to various embodiments of the present disclosure may include at least one of the above-described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

FIGS. 1-30 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. An electronic device comprising:
    a housing;
    a battery that is mounted in the housing and includes a plurality of cells;
    a circuit electrically connected to the battery;
    at least one processor receiving input from the circuit; and
    a conductive pattern electrically connected to the circuit in an interior of the housing, wherein the circuit is configured to:
    receive power from a first external device by using the conductive pattern,
    charge at least some of the plurality of cells in the battery by using the received power, wherein the at least some of the plurality of cells are connected in parallel,
    change a first voltage, which is generated by at least some other of the plurality of cells in the battery, into a second voltage that is lower than the first voltage, wherein the at least some other of the plurality of cells are connected in series,
    when the at least one processor receives a first input from the circuit, form a first conductive path by controlling a plurality of switches included in the circuit, and wirelessly transmit power corresponding to the second voltage to a second external device by using the conductive pattern via the first conductive path; and
    when the at least one processor receives a second input from the circuit, form a second conductive path by controlling the plurality of switches, and provide power from a wired interface via the second conductive path.

2. The electronic device of claim 1, further comprising:
    a display that is exposed through at least one side of the housing and is connected to the processor; and
    a memory electrically connected to the processor,
    wherein the memory stores instructions that, when executed configure the at least one processor to:
    selectively operate the plurality of switches based on whether the at least one processor receives the first input or the second input.

3. The electronic device of claim 2, wherein the at least one processor is further configured to control the display to display an indication of at least one of a charging state of the battery and a charging state of a battery of the second external device.

4. The electronic device of claim 1, wherein the circuit is configured to charge at least two of the plurality of cells in the battery, which are connected in parallel, by using the received power.

5. The electronic device of claim 1, wherein the circuit is configured to:
    receive power from a third external device over a wired connection between the electronic device and the third external device,
    charge at least some of the plurality of cells in the battery by using the power,
    change a third voltage, which is generated by a series connection between at least two of the plurality of cells in the battery, into a fourth voltage that is lower than the third voltage, and
    transmit power corresponding to the fourth voltage to a fourth external device over a wired connection between the electronic device and the fourth external device.

6. The electronic device of claim 5, wherein the circuit is further configured to provide at least some of the wired received power or the wirelessly received power to the fourth external device.

7. The electronic device of claim 5, wherein the circuit is further configured to provide at least some of the wired received power to the second external device, and prevent the wired received power from flowing into the conductive pattern.

8. The electronic device of claim 5, wherein the circuit is further configured to prevent the power provided to the second or fourth external device from flowing into the conductive pattern.

9. An electronic device comprising:
    a housing;
    a battery that is mounted in the housing and includes a plurality of cells; and
    a circuit electrically connected to the battery, wherein the circuit is configured to:
    receive first power from a first external device, the power being received over one of a wired channel and a wireless channel,
    divide the first power into a second power and a third power based on at least one charging parameter associated with at least one of the battery of the electronic device and a second external device;
    charge at least some of the plurality of cells in the battery by using the second power, and
    transmit the third power to a second external device over a wired channel by forming a first conductive path and a wireless channel by forming a second conductive path,
    wherein the first conductive path and the second conductive path are formed by controlling a plurality of switches included in the circuit.

10. The electronic device of claim 9, wherein the at least one charging parameter comprises at least one of a battery charging completion time, a battery capacity, a residual quantity of a battery, information on a connection with the second external device, a charging priority, a number of external devices that are connected to the electronic device, an amount of rechargeable power for a battery, and an operating state of the second external device.

11. A method in an electronic device, comprising:
    receiving power from a first external device, the received power being received over a wireless channel;
    charging at least some of a plurality of cells in a battery of the electronic device by using the received power, wherein the at least some of the plurality of cells are connected in parallel;

changing a first voltage, which is generated by the at least some other of the plurality of cells in the battery, into a second voltage that is lower than the first voltage, wherein the at least some other of the plurality of cells are connected in series;

when at least one processor receives a first input, forming a first conductive path by controlling a plurality of switches included in a circuit, and wirelessly transmitting power corresponding to the second voltage to a second external device via the first conductive path with a conductive pattern; and when the at least one processor receives a second input, forming a second conductive path by controlling the plurality of switches, and providing power from a wired interface via the second conductive path with the conductive pattern.

12. The method of claim 11, further comprising displaying, on a display of the electronic device, an indication of at least one of a charging state of the battery and a charging state of a battery of the second external device.

13. The method of claim 11, wherein the charging of the at least some of the plurality of cells in the battery comprises:

charging at least two of the plurality of cells in the battery, which are connected in parallel, by using the received power.

14. The method of claim 11, further comprising:

receiving power from a third external device over a wired connection between the electronic device and the third external device;

charging at least some of the plurality of cells in the battery by the received power from the third external device;

changing a third voltage, which is generated by a series connection between at least two of the plurality of cells in the battery, into a fourth voltage that is lower than the third voltage; and transmitting power corresponding to the fourth voltage to a fourth external device, the power corresponding to the fourth voltage being transmitted over a wired connection between the electronic device and the fourth external device.

15. The method of claim 14, further comprising:

transmitting, to the fourth external device, at least some of the wired received power or the wirelessly received power.

16. The method of claim 14, further comprising:

transmitting at least some of the wired received power to the second external device.

17. The method of claim 14, further comprising shutting off the power transmitted to the second or fourth external device to prevent the power from flowing into the first external device and the third external device.

* * * * *